US012555901B2

(12) United States Patent
Kim et al.

(10) Patent No.: US 12,555,901 B2
(45) Date of Patent: Feb. 17, 2026

(54) DISPLAY DEVICE AND MOBILE ELECTRONIC DEVICE INCLUDING THE SAME

(71) Applicants: SAMSUNG DISPLAY CO., LTD., Yongin-si (KR); Seoul National University R&DB Foundation, Seoul (KR)

(72) Inventors: Ki Seo Kim, Yongin-si (KR); Jung Suek Oh, Yongin-si (KR); Byeong Jin Kim, Yongin-si (KR); Young Sik Kim, Yongin-si (KR); Jeong Taek Oh, Yongin-si (KR); Jae Uk Choi, Yongin-si (KR)

(73) Assignees: SAMSUNG DISPLAY CO., LTD., Yongin-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 155 days.

(21) Appl. No.: 18/610,004

(22) Filed: Mar. 19, 2024

(65) Prior Publication Data

US 2025/0015491 A1 Jan. 9, 2025

(30) Foreign Application Priority Data

Jul. 4, 2023 (KR) .......................... 10-2023-0086398

(51) Int. Cl.
*H01Q 1/52* (2006.01)
*H01Q 1/22* (2006.01)
(Continued)

(52) U.S. Cl.
CPC .............. *H01Q 1/523* (2013.01); *H01Q 1/22* (2013.01); *H01Q 21/065* (2013.01);
(Continued)

(58) Field of Classification Search
CPC .......... H01Q 1/243; H01Q 1/52; H01Q 1/521; H01Q 1/523; H01Q 1/526; H01Q 21/06; H01Q 21/065; H01Q 21/08
See application file for complete search history.

(56) References Cited

U.S. PATENT DOCUMENTS

2021/0318730 A1* 10/2021 Lee ...................... G06F 1/1698
2023/0208958 A1 6/2023 Sung et al.
(Continued)

FOREIGN PATENT DOCUMENTS

KR 10-2020-0039311 A 4/2020
KR 10-2022-0069557 A 5/2022
(Continued)

*Primary Examiner* — Jason M Crawford
(74) *Attorney, Agent, or Firm* — F. CHAU & ASSOCIATES, LLC

(57) ABSTRACT

A display device includes a display panel that includes a display area that displays an image, a non-display area disposed at an edge of the display area, and an antenna area that protrudes in a first direction from a part of the non-display area, and an antenna driving substrate electrically connected to an antenna array through an antenna pad disposed adjacent to an end of the antenna area. The antenna array is disposed at a boundary between the antenna area and a portion of the non-display area adjacent to the antenna area. The antenna array includes a plurality of antennas that generate polarized waves in a second direction perpendicular to the first direction and that are disposed at intervals along the second direction, and a shielding member disposed between adjacent antennas and connected to a ground line.

20 Claims, 18 Drawing Sheets

(51) Int. Cl.
*H01Q 21/06* (2006.01)
*H05K 1/02* (2006.01)
*H05K 9/00* (2006.01)
*H10K 59/90* (2023.01)

(52) U.S. Cl.
CPC ......... *H05K 1/0218* (2013.01); *H05K 1/0274* (2013.01); *H05K 1/028* (2013.01); *H05K 9/006* (2013.01); *H10K 59/90* (2023.02); *H05K 2201/10098* (2013.01); *H05K 2201/10128* (2013.01)

(56) References Cited

U.S. PATENT DOCUMENTS

2025/0015491 A1* 1/2025 Kim ................ H05K 9/006
2025/0168265 A1* 5/2025 Kim ................ H01Q 19/30

FOREIGN PATENT DOCUMENTS

| KR | 10-2022-0086999 A | 6/2022 |
| KR | 10-2023-0101675 A | 7/2023 |
| KR | 10-2023-0101678 A | 7/2023 |

* cited by examiner

DISPLAY DEVICE AND MOBILE ELECTRONIC DEVICE INCLUDING THE SAME

CROSS-REFERENCE TO RELATED APPLICATION

This application claims priority under 35 U.S.C. 119 from Korean Patent Application No. 10-2023-0086398, filed on Jul. 4, 2023 in the Korean Intellectual Property Office, the contents of which are herein incorporated by reference in their entirety.

TECHNICAL FIELD

Embodiments of the present disclosure are directed to a display device and a mobile electronic device that includes the same.

DISCUSSION OF THE RELATED ART

With the advance of an information-oriented society, more and more demands are placed on display devices for displaying images in various ways. For example, display devices are used in various electronic devices, such as smartphones, digital cameras, laptop computers, navigation devices, and smart televisions.

A display device included in a mobile electronic device may include an antenna for transmitting and receiving electromagnetic waves for wireless communication. For example, a display device includes an antenna for fourth generation (4G) mobile communication such as long term evolution (LTE) and fifth generation (5G) mobile communication. The frequency band of the electromagnetic wave varies according to communication technology, and the shape or the length of the antenna varies according to the frequency band of the electromagnetic wave.

SUMMARY

Embodiments of the present disclosure provide a display device that increases transmission and reception efficiency of wireless communication in an antenna array that includes single-polarized array antennas and a mobile electronic device that includes the same.

According to an embodiment of the present disclosure, a display device includes a display panel that includes a display area that displays an image, a non-display area disposed at an edge of the display area, and an antenna area that protrudes in a first direction from a part of the non-display area, and an antenna driving substrate electrically connected to an antenna array through an antenna pad disposed adjacent to an end of the antenna area. The antenna array is disposed at a boundary between the antenna area and a portion of the non-display area adjacent to the antenna area. The antenna array includes a plurality of antennas that generate polarized waves in a second direction perpendicular to the first direction and that are disposed at intervals along the second direction, and a shielding member disposed between adjacent antennas and connected to a ground line.

The shielding member includes a shielding electrode between adjacent antennas that blocks surface waves formed along the second direction.

The shielding member includes a first shielding electrode connected to the ground line and that extends in the first direction, a second shielding electrode that extends in the second direction from an end of the first shielding electrode, and a third shielding electrode that extends from the end of the first shielding electrode in a third direction opposite to the second direction.

The second shielding electrode and the third shielding electrode may be symmetrically disposed with respect to the first shielding electrode.

The second shielding electrode and the third shielding electrode are aligned on an imaginary straight line along the second direction or the third direction.

The shielding member further includes a fourth shielding electrode that extends in the first direction from an end of the second shielding electrode and parallel to the first shielding electrode, and a fifth shielding electrode that extends in the first direction from an end of the third shielding electrode and parallel to the first shielding electrode.

A length of the fourth shielding electrode and a length of the fifth shielding electrode are equal to each other.

A length of the fourth shielding electrode or the fifth shielding electrode is shorter than a length of the first shielding electrode.

The antenna array is disposed on the same layer as at least one of electrodes of a thin film transistor disposed in the display area.

The antenna array is included in a transparent dielectric substrate disposed on an encapsulation layer of the display panel. The transparent dielectric substrate includes a flexible transparent dielectric layer, an antenna layer disposed on a top surface of the transparent dielectric layer and that includes the antenna array, and a ground layer disposed on a rear surface of the transparent dielectric layer and that includes the ground line.

Each of the plurality of antennas includes a first antenna electrode connected to a feed line and that extends in a first direction, a second antenna electrode branched from an end of the first antenna electrode in the second direction and connected to the ground line, and a third antenna electrode branched from the end of the first antenna electrode in a third direction opposite to the second direction and connected to the ground line.

A length of the second antenna electrode in the second direction is greater than a length of the third antenna electrode in the third direction.

Each of the plurality of antennas includes at least one slot.

The display device further includes an auxiliary shielding member disposed on each of both sides of the antenna array, and a structure of the auxiliary shielding member is the same as that of the shielding member.

At least a part of the antenna area is bent and parallel to the antenna array under the display panel.

According to an embodiment of the present disclosure, a mobile electronic device includes a display panel that includes a display area that displays an image, a non-display area disposed at an edge of the display area, and an antenna area that protrudes in a first direction from a part of the non-display area, and an antenna driving substrate electrically connected to an antenna array through an antenna pad disposed adjacent to an end of the antenna area. The antenna array includes a plurality of antennas that generate polarized waves in a second direction perpendicular to the first direction and that are disposed at intervals along the second direction, and a shielding member disposed between adjacent antennas and connected to a ground line. The shielding member includes a shielding electrode that blocks surface waves formed along the second direction between the adjacent antennas.

The antenna array is disposed at a boundary between the antenna area and a portion of the non-display area adjacent to the antenna area.

The shielding member includes a first shielding electrode connected to the ground line and that extends in the first direction, a second shielding electrode that extends in the second direction from an end of the first shielding electrode, and a third shielding electrode that extends from the end of the first shielding electrode in a third direction opposite to the second direction.

The second shielding electrode and the third shielding electrode are symmetrically disposed with respect to the first shielding electrode.

The second shielding electrode and the third shielding electrode are aligned on an imaginary straight line along the second direction or the third direction.

In accordance with a display device and a mobile electronic device that includes the same according to embodiments, the transmission and reception efficiency of wireless communication is increased in an antenna array that includes single-polarized array antennas.

DETAILED DESCRIPTION

Embodiments of the present disclosure will now be described more fully hereinafter with reference to the accompanying drawings, in which embodiments of the invention are shown.

It will be understood that when a layer is referred to as being "on" another layer or substrate, it can be directly on the other layer or substrate, or intervening layers may also be present. The same reference numbers may indicate the same components throughout the specification.

Features of each of various embodiments of the present disclosure may be partially or entirely combined with each other and may technically variously interwork with each other, and respective embodiments may be implemented independently of each other or may be implemented together in association with each other.

Hereinafter, embodiments will be described with reference to the accompanying drawings.

Figure 1:
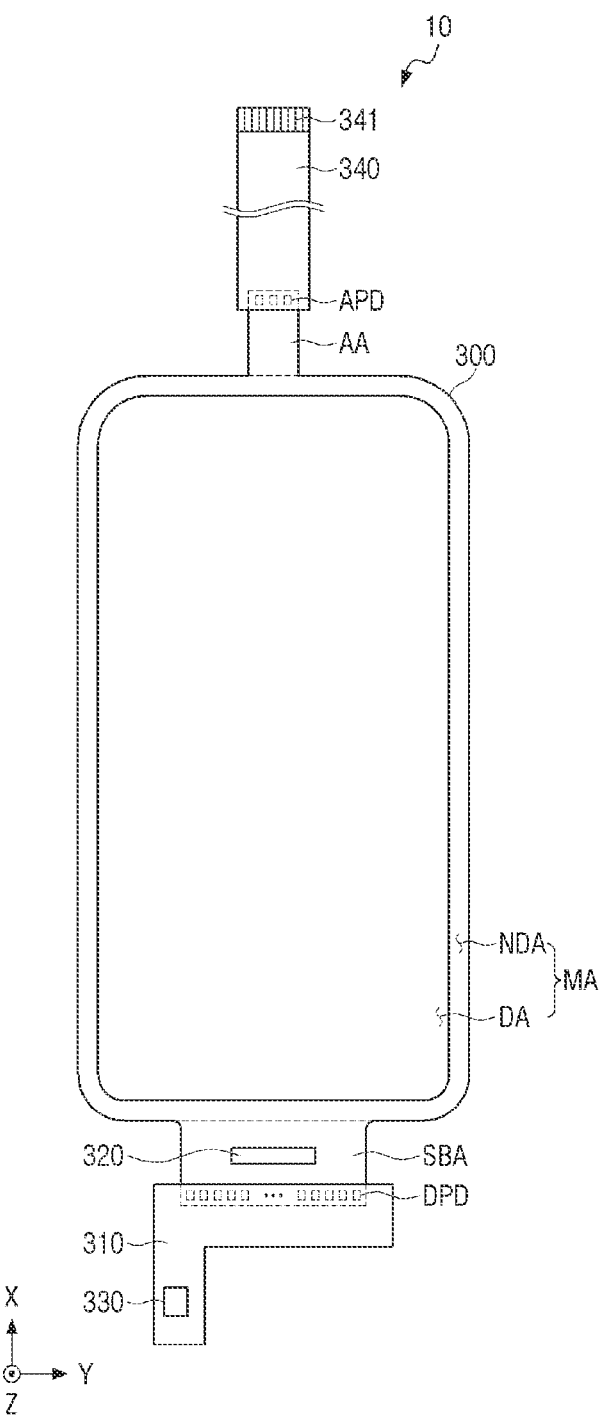
FIGS. 1 and 2 are plan views of a display device according to an embodiment.
Figure 2:
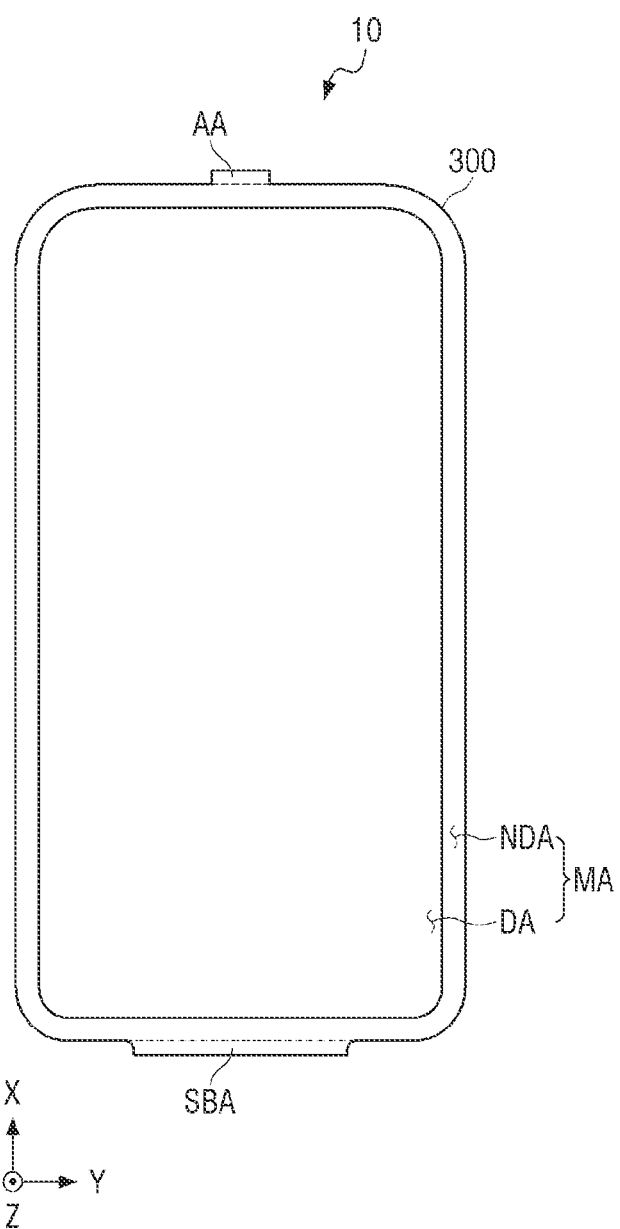

FIGS. 1 and 2 are plan views of a display device according to an embodiment.

Referring to FIGS. 1 and 2, a display device 10 according to an embodiment can be incorporated into a mobile electronic device such as a mobile phone, a smartphone, a tablet personal computer, a mobile communication terminal, an electronic organizer, an electronic book, a portable multimedia player (PMP), a navigation system, an ultra mobile PC (UMPC), etc. In addition, the display device 10 according to an embodiment can be used as a display unit of a television, a laptop, a monitor, a billboard, or an Internet-of-Things (IoT) terminal. In addition, the display device 10 according to an embodiment can be incorporated into a wearable device such as a smart watch, a watch phone, a glasses type display, or a head mounted display (HMD). In addition, the display device 10 according to an embodiment can be incorporated into a dashboard of a vehicle, a center fascia of a vehicle, a center information display (CID) disposed on a dashboard of a vehicle, a room mirror display in place of side mirrors of a vehicle, or a display disposed on a rear surface of a front seat for rear seat entertainment of a vehicle.

In the present disclosure, a first direction (X-axis direction) is a long side direction of the display device 10, such as a vertical direction of the display device 10. A second direction (Y-axis direction) is a short side direction of the display device 10, such as a horizontal direction of the display device 10. A third direction (Z-axis direction) is a thickness direction of the display device 10. A corner where the long side in the first direction (X-axis direction) and the short side in the second direction (Y-axis direction) meet may be rounded with a predetermined curvature or may be right-angled.

The display device 10 according to an embodiment includes a display panel 300, a display circuit board 310, a display driving circuit 320, a touch driving circuit 330, and an antenna circuit board 340. A connector 341 is formed on one side of the antenna circuit board 340.

The display panel 300 is a light emitting display panel that includes a light emitting element. For example, the display panel 300 is one of an organic light emitting display panel that uses an organic light emitting diode that includes an organic light emitting layer, a micro light emitting diode display panel that uses a micro LED, a quantum dot light emitting display panel that uses a quantum dot light emitting diode that includes a quantum dot light emitting layer, or an inorganic light emitting display panel that uses an inorganic light emitting element that includes an inorganic semiconductor.

The display panel 300 may be a flexible display panel that can be easily bent, folded, or rolled. For example, the display panel 300 is one of a foldable display panel that can be folded and unfolded, a curved display panel that has a curved display surface, a bent display panel that has a bent area other than the display surface, a rollable display panel that can be rolled up and rolled out, or a stretchable display panel that can be stretched.

The display panel 300 includes a main area MA, a sub-area SBA that protrudes from one side of the main area MA, and an antenna area AA that protrudes from another side of the main area MA.

The main area MA includes a display area DA that displays an image and a non-display area NDA that is a peripheral to the display area DA. The display area DA occupies most of the main area MA. The display area DA is disposed at the center of the main area MA. The non-display area NDA is outside the display area DA. The non-display area NDA is an edge area of the display panel 300. The non-display area NDA may be referred to as a dead space area DS.

The sub-area SBA protrudes in the first direction (X-axis direction) from one side of the main area MA. For example, the one side of the main area MA is a lower side of the main area MA. As illustrated in FIG. 1, the length of the sub-area SBA in the first direction (X-axis direction) is less than the length of the main area MA in the first direction (X-axis direction), and the length of the sub-area SBA in the second direction (Y-axis direction) is less than the length of the main area MA in the second direction (Y-axis direction), but embodiments of the present disclosure are not necessarily limited thereto.

Referring to FIG. 2, in an embodiment, the sub-area SBA can be bent, and at least a part of the bent sub-area SBA is disposed under the display panel 300. For example, at least a part of the sub-area SBA overlaps the main area MA of the display panel 300 in the third direction (Z-axis direction).

Display pads DPD are disposed at one side edge of the sub-area SBA. The one side edge of the sub-area SBA is a lower side edge of the sub-area SBA. The display circuit board 310 is attached to the display pads DPD of the sub-area SBA. The display circuit board 310 is attached to the display pads DPD of the sub-area SBA by using a conductive adhesive member such as an anisotropic conductive film and/or an anisotropic conductive paste. The display circuit board 310 may be a flexible printed circuit board (FPCB) that is bendable, a rigid printed circuit board (PCB) that cannot be bent, or a composite printed circuit board that includes both of the rigid printed circuit board and the flexible printed circuit board.

The display driving circuit 320 is disposed on the sub-area SBA of the display panel 300. The display driving circuit 320 receives control signals and power voltages, and generates and outputs signals and voltages that drive the display panel 300. The display driving circuit 320 is formed as an integrated circuit (IC).

The touch driving circuit 330 is disposed on the display circuit board 310. The touch driving circuit 330 is formed as an integrated circuit. The touch driving circuit 330 is attached to the display circuit board 310.

The touch driving circuit 330 is electrically connected to sensor electrodes of a sensor electrode layer of the display panel 300 through the display circuit board 310. The touch driving circuit 330 outputs a touch driving signal to each of the sensor electrodes, and senses a voltage change according to mutual capacitance of the sensor electrodes.

The sensor electrode layer of the display panel 300 can sense a proximity touch and/or a contact touch. A contact touch means that the object such as a human finger or a pen makes direct contact with a cover window disposed above the sensor electrode layer. A proximity touch means that the object such as the human finger or the pen is sensed while positioned above the cover window, such as hovering.

A power supply unit that supplies driving voltages that drive the display pixels of the display panel 300 and the display driving circuit 320 may be additionally disposed on the display circuit board 310. In other embodiments, the power supply unit is integrated with the display driving circuit 320, and, for example, the display driving circuit 320 and the power supply unit are formed as a single integrated circuit.

The antenna area AA includes at least one of an antenna electrode, a feed line, or a ground line of an antenna module for wireless communication. The antenna area AA protrudes from another side of the main area MA in the first direction (X-axis direction). For example, the another side of the main area MA is an upper side of the main area MA. As illustrated in FIG. 1, the length of the antenna area AA in the first direction (X-axis direction) is less than the length of the main area MA in the first direction (X-axis direction), and the length of the antenna area AA in the second direction (Y-axis direction) is less than the length of the main area MA in the second direction (Y-axis direction), but embodiments of the present disclosure are not necessarily limited thereto.

As illustrated in FIG. 2, at least a part of the antenna area AA is bent, and at least a part of the bent antenna area AA is disposed under the display panel 300. For example, at least a part of the antenna area AA overlaps the main area MA of the display panel 300 in the third direction (Z-axis direction).

Antenna pads APD are disposed at one side edge of the antenna area AA. The antenna circuit board 340 is attached to the antenna pads APD of the antenna area AA. The antenna circuit board 340 is attached to the antenna pads APD of the antenna area AA by using a conductive adhesive member such as an anisotropic conductive film and/or an anisotropic conductive adhesive. One side of the antenna circuit board 340 includes the connector 341 connected to a main circuit board 400 on which an antenna driving circuit 350 (see FIG. 4) is mounted. The antenna circuit board 340 is a flexible printed circuit board (FPCB) that can be bent.

Figure 3:
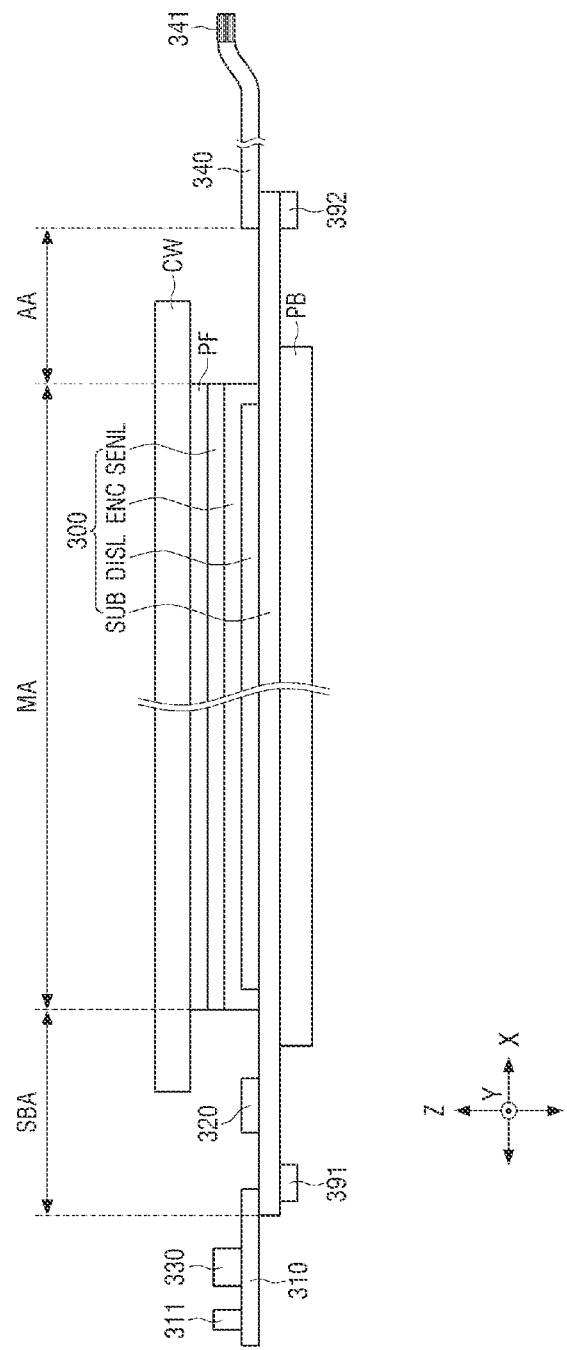
FIGS. 3 and 4 are side views of a display device according to an embodiment.
Figure 4:
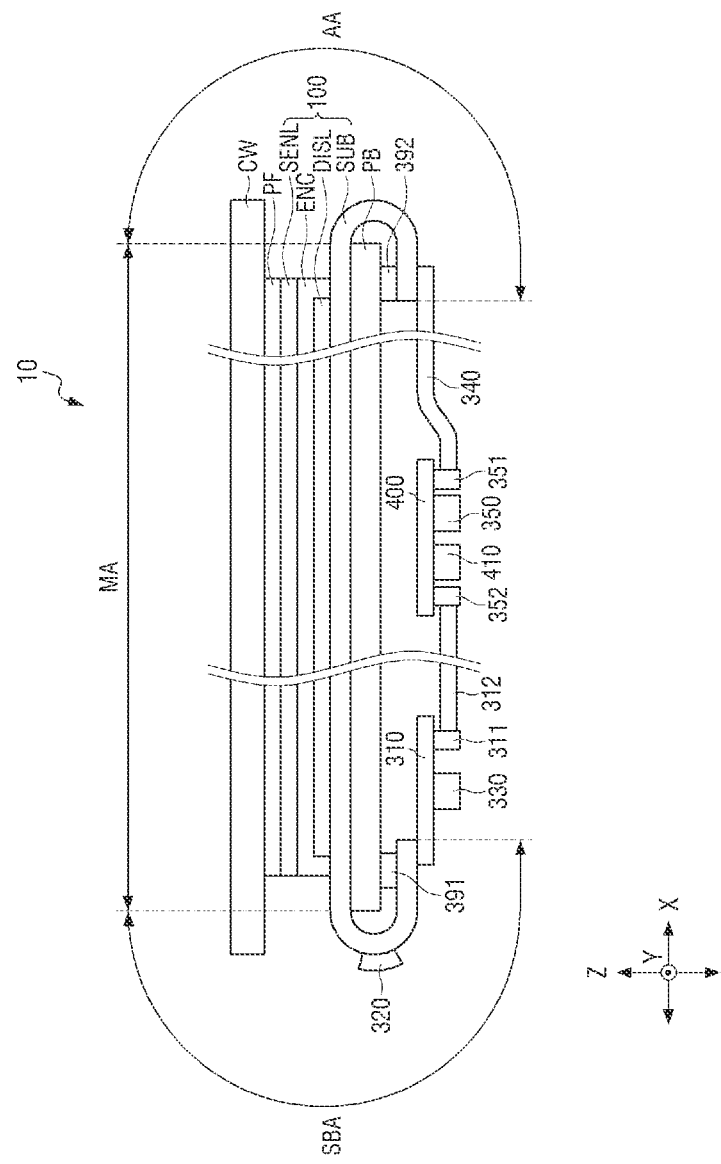

FIGS. 3 and 4 are side views of a display device according to an embodiment.

Referring to FIGS. 3 and 4, the display device 10 according to an embodiment includes the display panel 300, a polarizing film PF, a cover window CW, and a panel lower cover PB. The display panel 300 includes a substrate SUB, a display layer DISL, an encapsulation layer ENC, and a sensor electrode layer SENL.

The substrate SUB is formed of an insulating material such as polymer resin. The substrate SUB is a flexible substrate that can be bent, folded or rolled.

In the main area MA, the display layer DISL is disposed on the substrate SUB. The display layer DISL includes emission areas that display an image. The display layer DISL includes a thin film transistor layer in which thin film transistors are formed, and a light emitting element layer in which light emitting elements that emit light are disposed in the emission areas.

In the display area DA of the display layer DISL, scan lines, data lines, power lines, etc., that drive light emitting elements in the emission area are disposed. In the non-display area NDA of the display layer DISL, a scan driver that outputs scan signals to the scan lines, fan-out lines that connect the data lines and the display driving circuit 320, etc., are disposed.

The encapsulation layer ENC is disposed on the display layer DISL. The encapsulation layer ENC encapsulates the light emitting element layer of the display layer DISL to prevent permeation of oxygen or moisture into the light emitting element layer of the display layer DISL. The encapsulation layer ENC is disposed on the top surfaces and the side surfaces of the display layer DISL.

The sensor electrode layer SENL is disposed on the display layer DISL. In an embodiment, the sensor electrode layer SENL is disposed on the encapsulation layer ENC. The sensor electrode layer SENL includes sensor electrodes. The sensor electrode layer SENL can sense a touch using the sensor electrodes.

The polarizing film PF is disposed on the sensor electrode layer SENL. The polarizing film PF includes a first base member, a linear polarization plate, a phase retardation film such as a quarter-wave plate ($\lambda/4$ plate), and a second base member. The first base member, the phase retardation film, the linear polarization plate, and the second base member are sequentially stacked on the sensor electrode layer SENL.

The cover window CW is disposed on the polarizing film PF. The cover window CW can be attached onto the polarizing film PF by a transparent adhesive member such as an optically clear adhesive (OCA) film.

The panel lower cover PB is disposed under the display panel 300. The panel lower cover PB can be attached to the bottom surface of the display panel 300 through an adhesive member. The adhesive member may be a pressure sensitive adhesive (PSA). The panel lower cover PB includes at least one of a light blocking member that absorbs externally light incident, a buffer member that absorbs external impacts, or a heat dissipation member that efficiently dissipates heat from the display panel 300.

The light blocking member is disposed under the display panel 300. The light blocking member blocks light transmission, thereby preventing components, such as the display circuit board 310, etc., disposed under the light blocking member from being viewed from above the display panel 300. The light blocking member includes a light absorbing material such as a black pigment, black dyes, etc.

The buffer member is disposed under the light blocking member. The buffer member absorbs external impacts to prevent the display panel 300 from being damaged. The buffer member may be formed of a single layer or of multiple layers. For example, the buffer member is formed of a polymer resin such as polyurethane (PU), polycarbonate (PC), polypropylene (PP), or polyethylene (PE) or includes an elastic material such as a foamed sponge obtained from rubber, a urethane-based material, or an acrylic material.

The heat dissipation member is disposed under the buffer member. The heat dissipation member includes a first heat dissipation layer that contains graphite or carbon nanotubes, etc., and a second heat dissipation layer formed of a metal thin film that contains, for example, at least one of copper, nickel, ferrite, or silver, which are thermally conductive materials that can shield electromagnetic waves.

In accordance with an embodiment, as shown in FIG. 4, the substrate SUB can be bent in the sub-area SBA, and can be disposed under the display panel 300. The sub-area SBA of the substrate SUB is attached to the bottom surface of the panel lower cover PB by a first adhesive member 391. The first adhesive member 391 is a pressure sensitive adhesive.

In accordance with an embodiment, as shown in FIG. 4, the antenna area AA of the substrate SUB can be bent, and can be disposed under the display panel 300. The antenna area AA of the substrate SUB is attached to the bottom surface of the panel lower cover PB by a second adhesive member 392. The second adhesive member 392 is a pressure sensitive adhesive.

The display circuit board 310 is attached to the display pads DPD of the sub-area SBA of the substrate SUB by using a conductive adhesive member such as an anisotropic conductive film or an anisotropic conductive adhesive. The display circuit board 310 includes a connector 311 connected to a flexible printed circuit board 312. The display circuit board 310 is connected to a connector 352 of a main circuit board 400 through the flexible printed circuit board 312.

The touch driving circuit 330 is disposed on the display circuit board 310. The touch driving circuit 330 generates touch data according to changes in electrical signals sensed by each of the sensor electrodes of the sensor electrode layer of the display panel 300, and transmits the touch data to a main processor 410 of the main circuit board 400, and the main processor 410 calculates a touch coordinate in which a touch has occurred by analyzing the touch data.

The antenna circuit board 340 is attached to the antenna pads APD of the antenna area AA of the substrate SUB by using a conductive adhesive member such as an anisotropic conductive film or an anisotropic conductive adhesive. A connector 341 of the antenna circuit board 340 is connected to a connector 351 of the main circuit board 400. The antenna area AA is connected to the main circuit board 400 by the antenna circuit board 340.

The main circuit board 400 is a rigid printed circuit board (PCB) that is rigid and does not easily bend. The main processor 410 and an antenna driving circuit 350 are disposed on the main circuit board 400.

The antenna driving circuit 350 is electrically connected to antennas ANT (see FIG. 9) of the display panel 300 through the antenna circuit board 340. Accordingly, the antenna driving circuit 350 receives electromagnetic signals through the antennas ANT and outputs electromagnetic signals to be transmitted through the antennas ANT. The antenna circuit board 340 is formed of an integrated circuit (IC).

The antenna driving circuit 350 processes electromagnetic signals transmitted and received through the antennas ANT. For example, the antenna driving circuit 350 can change the amplitude of an electromagnetic signal received by the antennas ANT. In other embodiments, the antenna driving circuit 350 can change the phase as well as the amplitude of the electromagnetic signal received by the antenna electrodes. The antenna driving circuit 350 transmits the processed electromagnetic signal to a mobile communication module. The mobile communication module may be disposed on the main circuit board 400.

The antenna driving circuit 350 changes the amplitude of the electromagnetic signal received from the mobile communication module. In other embodiments, the antenna driving circuit 350 changes the phase as well as the amplitude of the electromagnetic signal received from the mobile communication module. The antenna driving circuit 350 transmits the processed electromagnetic signal to the antennas ANT.

Figure 5:
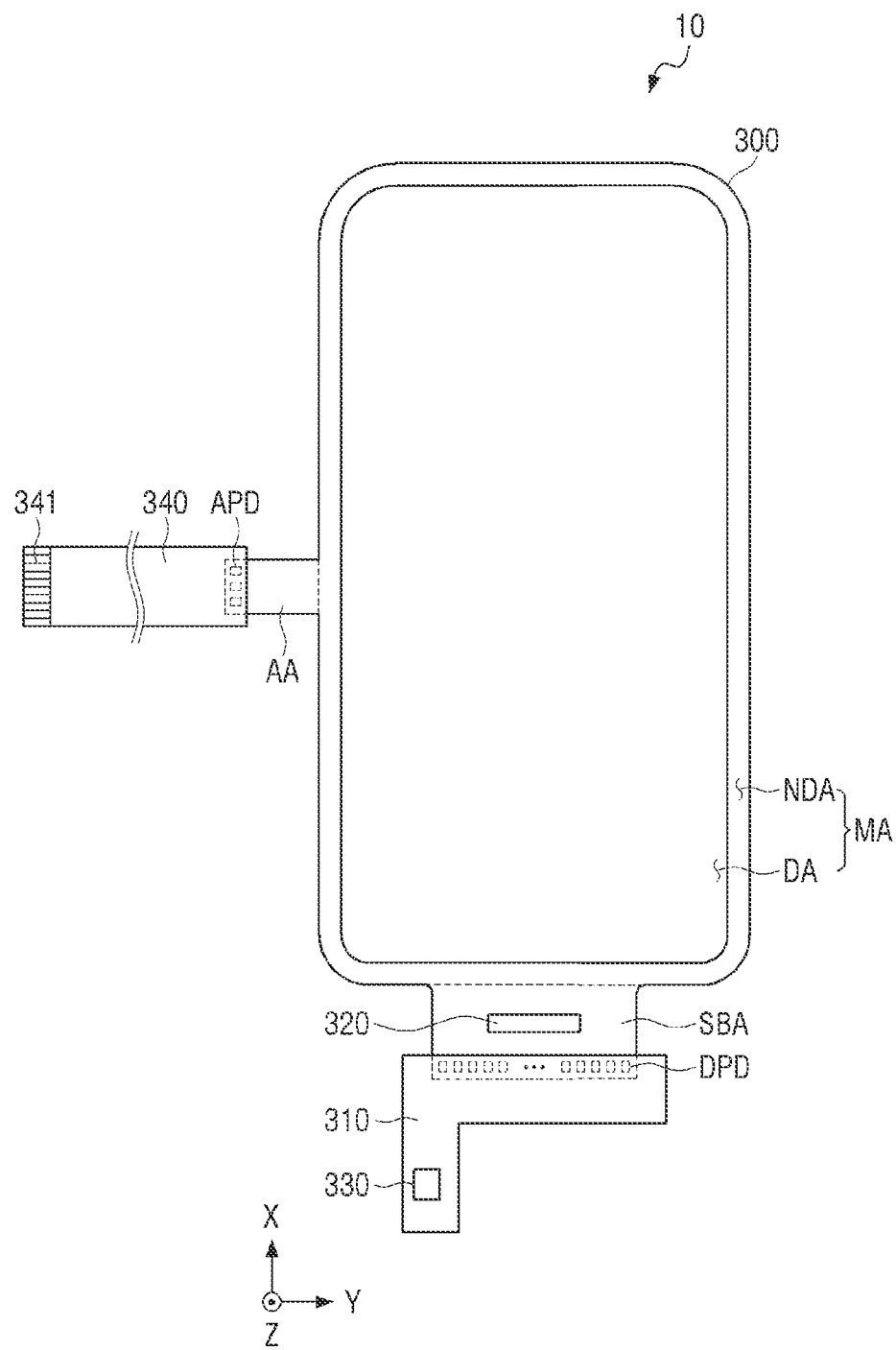
FIGS. 5 and 6 are plan views of a display device according to an embodiment.
Figure 6:
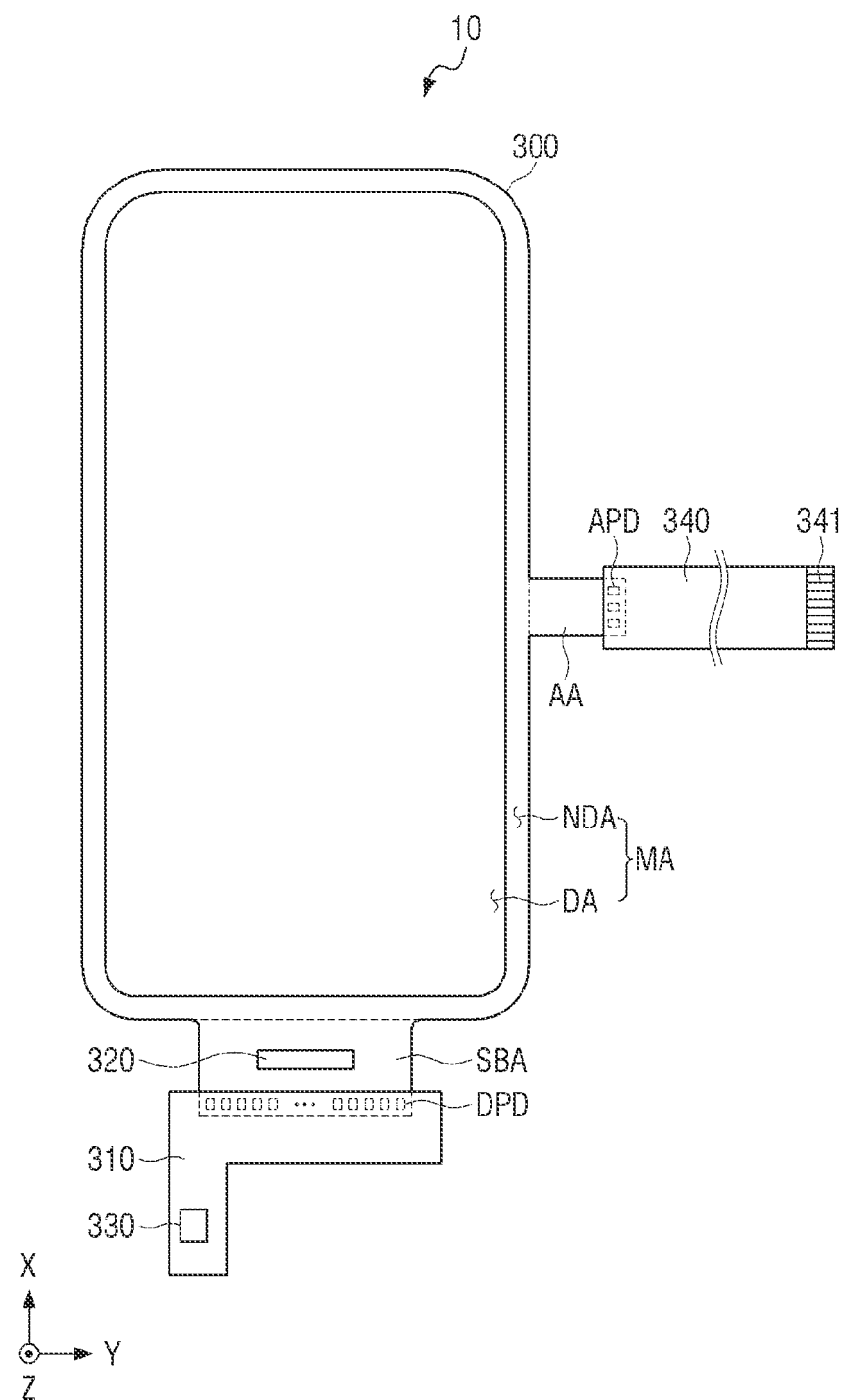

FIG. 5 is a plan view of a display device according to an embodiment. FIG. 6 is a plan view of a display device according to an embodiment.

An embodiment of FIG. 5 differs from embodiments of FIGS. 1 and 2 in that the antenna area AA protrudes from the left side of the main area MA in the second direction (Y-axis direction). An embodiment of FIG. 6 differs from embodiments of FIGS. 1 and 2 in that the antenna area AA protrudes from the right side of the main area MA in the second direction (Y-axis direction). In FIGS. 5 and 6, redundant description of parts already described in the embodiment of FIGS. 1 and 2 may be omitted.

As illustrated in FIGS. 5 and 6, in some embodiments, the antenna area AA protrudes from one side of the main area MA, and the one side of the main area MA is one of the upper side, the lower side, a left side, or a right side of the main area MA.

In addition, the antenna area AA may protrude from the lower side of the main area MA in the second direction (Y-axis direction), or the antenna area AA may be spaced apart from the sub-area SBA in the second direction (Y-axis direction). For example, the length of the antenna area AA in the first direction (X-axis direction) is less than the length of the sub-area SBA in the first direction (X-axis direction), and the length of the antenna area AA in the second direction (Y-axis direction) is less than the length of the sub-area SBA in the second direction (Y-axis direction), but embodiments of the present disclosure are not necessarily limited thereto.

In the following description, the antenna ANT formed in the antenna area AA and the non-display area NDA adjacent thereto will be described focusing on embodiments of FIGS. 1 and 2, but characteristics of the antenna ANT described below can also be applied to embodiments of FIGS. 5 and 6.

Figure 7:
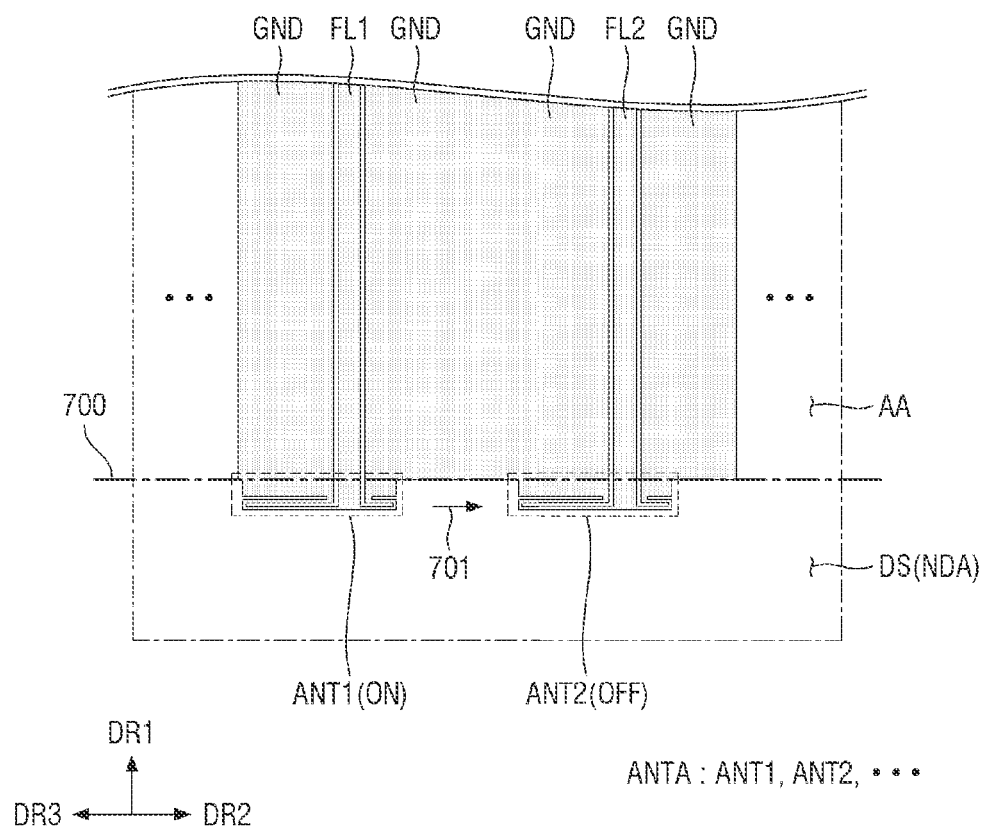
FIG. 7 is a plan view of an antenna area according to a comparative example.
Figure 8:
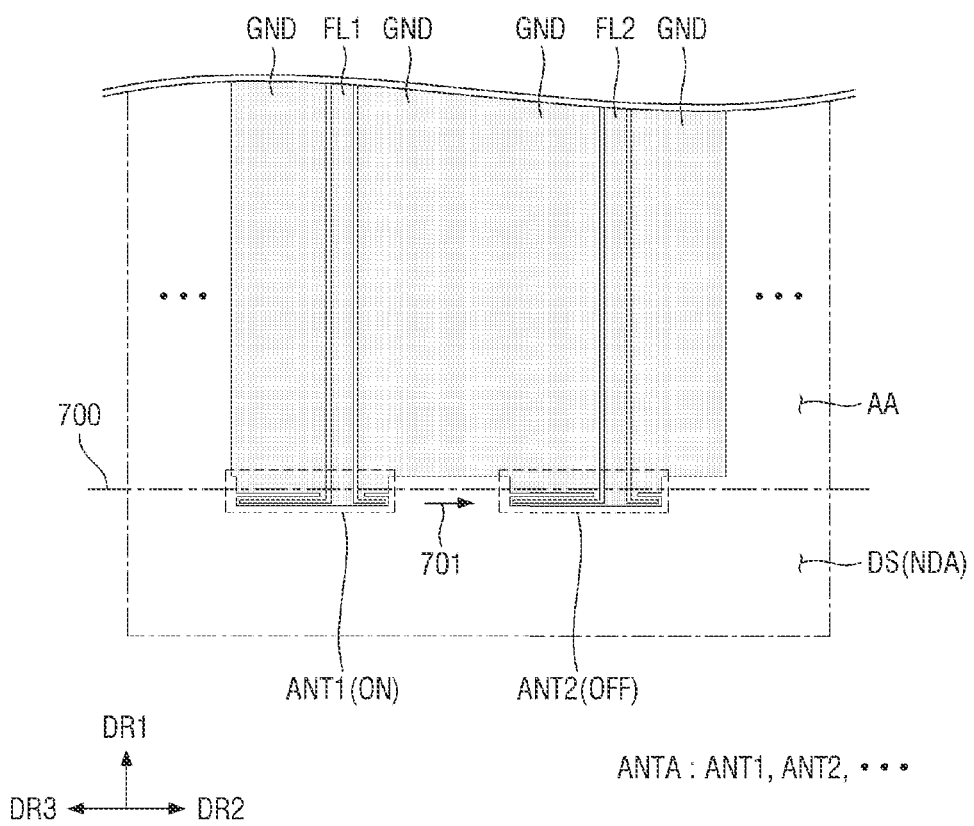
FIG. 8 illustrates surface waves generated by an antenna array of a comparative example, and performance deterioration caused by the surface waves.

FIG. 7 is a plan view of the antenna area AA according to a comparative example. FIG. 8 illustrates surface waves generated by an antenna array ANTA of a comparative example, and performance deterioration caused by the surface waves.

In FIGS. 7 and 8, a dotted line 700 is an imaginary boundary line that divides the antenna area AA and the dead space area DS that is the non-display area NDA. The display panel 300 according to a comparative example can be bent along the imaginary boundary line dividing the antenna area AA and the dead space area DS. In the illustrated example, an area positioned on the upper side of the boundary line 700 represents a part of the antenna area AA, and an area positioned on the lower side of the boundary line 700 represents a part of the dead space area DS. For example, as shown in FIG. 7, the antennas ANT of the antenna array ANTA according to the comparative example disposed in the dead space area DS adjacent to the antenna area AA, and feed lines FL and ground lines GND connected to the antennas ANT are disposed in the antenna area AA. However, as shown in FIG. 8, some of the antennas ANT of the antenna array ANTA according to a comparative example are disposed in the dead space area DS over the boundary line 700.

In accordance with the comparative example, the display panel 300 of the display device 10 includes the antenna array ANTA disposed in a part of the non-display area NDA. The antenna array ANTA includes single-polarized array antennas ANT. For example, the antennas ANT of the antenna array ANTA may be disposed at equal or unequal intervals along the second direction DR2.

Each of the antennas ANT of the antenna array ANTA is configured to generate electromagnetic waves with a single polarization, such as a polarization in the second direction DR2. FIGS. 7 and 8 show a first antenna ANT1 connected to a first feed line FL1 and a second antenna ANT2 connected to a second feed line FL2 as examples of single-polarized array antennas ANT according to the comparative example.

In accordance with the comparative example, the antennas ANT in the antenna array ANTA are independently driven. For example, the second antenna ANT2 does not operate while the first antenna ANT1 is in an on state and generates polarized waves in the second direction DR2. For example, the first antenna ANT1 does not operate while the second antenna ANT2 is in an on state and generates polarized waves in the second direction DR2. Further, the first antenna ANT1 and the second antenna ANT2 can simultaneously operate. In the comparative example, settings related to beam formation and beam steering can change by independently driving the antennas ANT in the antenna array ANTA.

In accordance with the comparative example, since the antennas ANT in the antenna array ANTA are spaced apart from each other at intervals along the second direction DR2, interference between the antennas ANT can occur. For example, when a specific antenna ANT operates, antennas ANT adjacent thereto are affected by electromagnetic coupling that occurs along the second direction DR2. For example, when the first antenna ANT1 is driven in an on state and the second antenna ANT2 is driven in an off state, the polarized waves in the second direction DR2 generated by the first antenna ANT1 generate surface waves 701 in the second direction DR2. The generated surface waves 701 are transmitted from the first antenna ANT1 to the adjacent second antenna ANT2. For example, the second antenna ANT2 can operate while being unintentionally coupled with the first antenna ANT1. The interference between the antennas ANT can cause unintentional beam formation and beam steering, and thus can decrease the efficiency of the antenna ANT.

The display panel 300 according to an embodiment of the present disclosure includes the antenna array ANTA, and uses a shielding member 910 (see FIG. 9) that blocks the effect of electromagnetic coupling, such as surface waves, generated along the second direction DR2 from adjacent antennas ANT. Accordingly, the antenna array ANTA in the display panel 300 according to an embodiment of the present disclosure increases the efficiency of the antenna ANT as compared to the comparative example. Hereinafter, the antenna array ANTA according to an embodiment of the present disclosure will be described in detail in conjunction with FIGS. 9 to 15.

Figure 9:
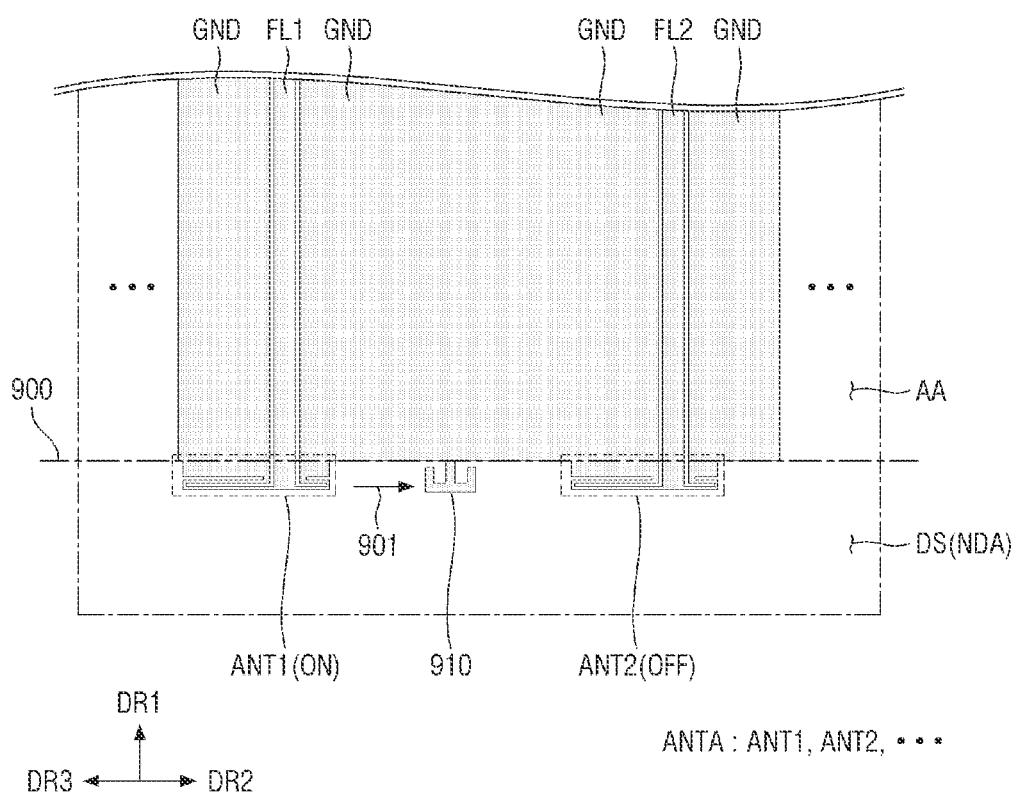
FIG. 9 is a plan view of an example of an antenna area according to an embodiment.
Figure 10:
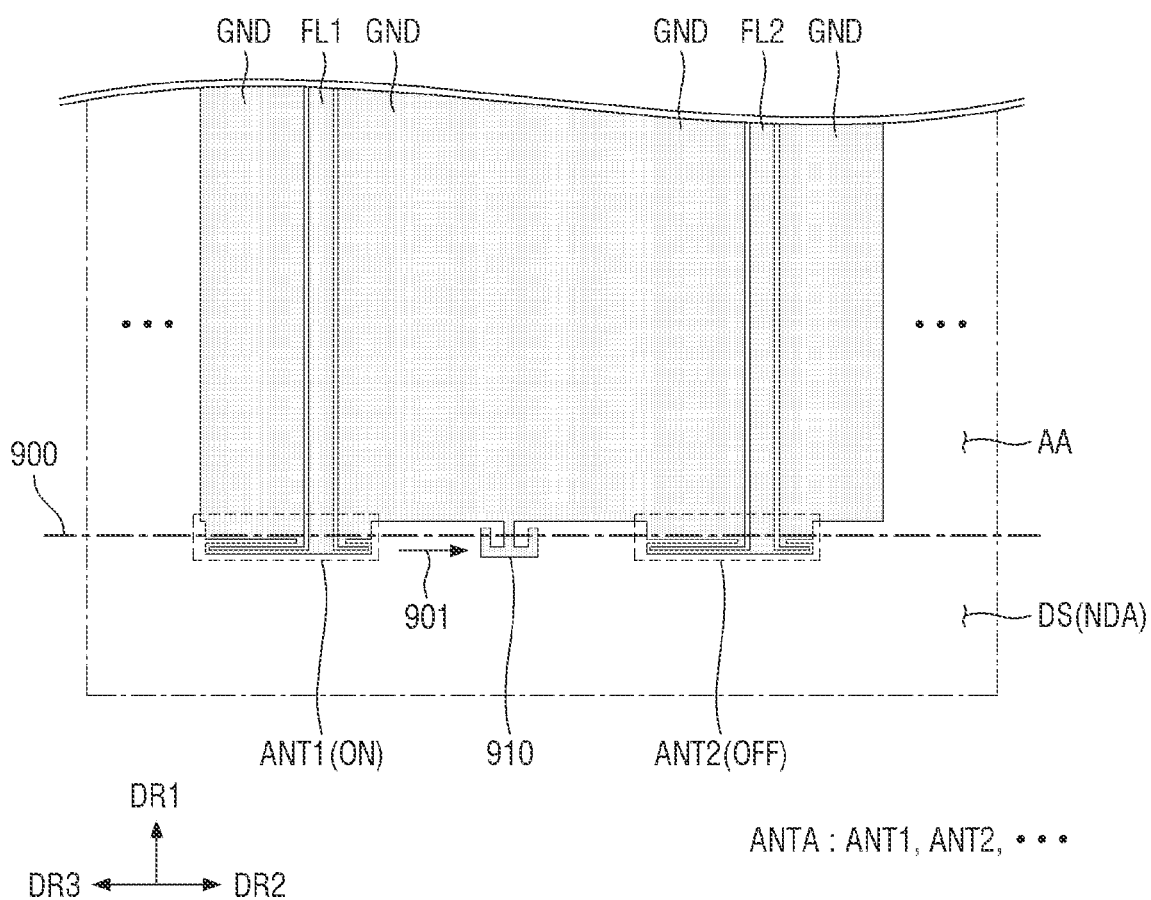
FIG. 10 is a plan view of another example of an antenna area according to an embodiment.

FIG. 9 illustrates an example of the antenna area AA according to an embodiment. FIG. 10 illustrates another example of the antenna area AA according to an embodiment.

In FIGS. 9 and 10, a dotted line 900 is an imaginary boundary line that divides the antenna area AA and the dead space area DS. The display panel 300 according to the comparative example can be bent along the imaginary boundary line 900 that divides the antenna area AA and the dead space area DS. In the illustrated example, an area positioned on the upper side of the boundary line 900 represents a part of the antenna area AA, and an area positioned on the lower side of the boundary line 900 represents a part of the dead space area DS. For example, as shown in FIG. 9, the antennas ANT of the antenna array ANTA are disposed in the dead space area DS adjacent to the antenna area AA, and the feed lines FL and the ground lines GND connected to the antennas ANT are disposed in the antenna area AA. In another embodiment, as shown in FIG. 10, some of the antennas ANT of the antenna array ANTA are disposed in the dead space area DS over the boundary line 900.

In accordance with an embodiment, the display panel 300 of the display device 10 includes the antenna array ANTA disposed in a part of the non-display area NDA. The antenna array ANTA includes single-polarized array antennas ANT. In addition, the antennas ANT of the antenna array ANTA may be disposed at equal or unequal intervals along the second direction DR2 In some embodiments, the antennas ANT of the antenna array ANTA are disposed along the second direction DR2 in atypical arrangement, such as a zigzag shape.

Each of the antennas ANT of the antenna array ANTA is configured to generate electromagnetic waves with a single polarization, such as polarization in the second direction DR2. FIGS. 9 and 10 show the first antenna ANT1 connected to the first feed line FL1 and the second antenna ANT2 connected to the second feed line FL2 as examples of single-polarized array antennas ANT according to an embodiment. However, embodiments of the present disclosure are not necessarily limited thereto. In other embodiments, the antenna array ANTA includes one or more antennas ANT arranged side by side with the first antenna ANT1 and the second antenna ANT2 along the second direction DR2, in addition to the illustrated first and second antennas ANT1 and ANT2.

In accordance with an embodiment, the antennas ANT included in the antenna array ANTA can be independently driven. For example, the second antenna ANT2 does not operate while the first antenna ANT1 is in an on state and generates polarized waves in the second direction DR2, and the first antenna ANT1 does not operate while the second antenna ANT2 is in an on state and generates polarized waves in the second direction DR2. Further, the first antenna ANT1 and the second antenna ANT2 can operate simultaneously. In an embodiment of the present disclosure, settings related to beam formation and beam steering change by independently driving the antennas ANT in the antenna array ANTA.

As described with reference to FIGS. 7 and 8, when the antennas ANT in the antenna array ANTA are spaced apart from each other at intervals along a specific direction, interference between the antennas ANT can occur. In an embodiment of the present disclosure, the shielding member 910 is disposed between the adjacent antennas ANT to block interference, such as surface waves, between the antennas ANT.

In accordance with an embodiment, the shielding member 910 includes shielding electrodes 911, 912, 913, 914, and 915 (see FIG. 11) disposed between the adjacent antennas ANT and connected to the ground line GND. The shielding electrodes 911, 912, 913, 914, and 915 (see FIG. 11) block the effect of the electromagnetic coupling, such as surface waves, 901 that occurs along the second direction DR2 from a specific antenna ANT during the operation of the specific antenna ANT. Accordingly, the antennas ANT in the antenna array ANTA operate independently, and the interference therebetween is minimized, thereby increasing the efficiency of the antennas ANT.

Hereinafter, the characteristics of the antenna array ANTA will be described by focusing on the first antenna ANT1 of the plurality of antennas ANT in the antenna array ANTA. The characteristics of the first antenna ANT1 to be described below apply to the other antennas ANT in the antenna array ANTA.

In accordance with an embodiment, the first antenna ANT1 is disposed in the dead space area DS adjacent to the antenna area AA. The first antenna ANT1 is connected to the first feed line FL1 and the ground line GND disposed in the antenna area AA. The first feed line FL1 is disposed between adjacent ground lines GND. The first feed line FL1 has a ground coplanar waveguide (GCPW) structure. In another embodiment, the first feed line FL1 has a coplanar waveguide (CPW) structure.

In the antenna area AA, the first feed line FL1 and the ground line GND extend in the first direction DR1, and thus are electrically connected to the antenna pad APD (see, for example, FIG. 1).

The first antenna ANT1 includes a structure obtained by tuning the shape of a dipole antenna. The first antenna ANT1 includes an asymmetrical antenna structure with respect to the first feed line FL1 to generate a field in the second direction DR2 (e.g., Y-axis direction) perpendicular to the first direction DR1 (e.g., X-axis direction). For example, the antenna structure includes antenna electrodes AE1, AE2, and AE3 (see FIG. 15) that form the first antenna ANT1, and one or more slots S1 and S2 (see FIG. 15) (or slits) formed therein. In each first antenna ANT1, the slots S1 and S2 (see FIG. 15) (or slits) are spaces between the antenna electrodes AE1, AE2, and AE3 (see FIG. 15) where no metal is formed. The structure of each antenna ANT of the antenna array ANTA according to an embodiment of the present disclosure will be described in detail below with reference to FIG. 15.

Figure 11:
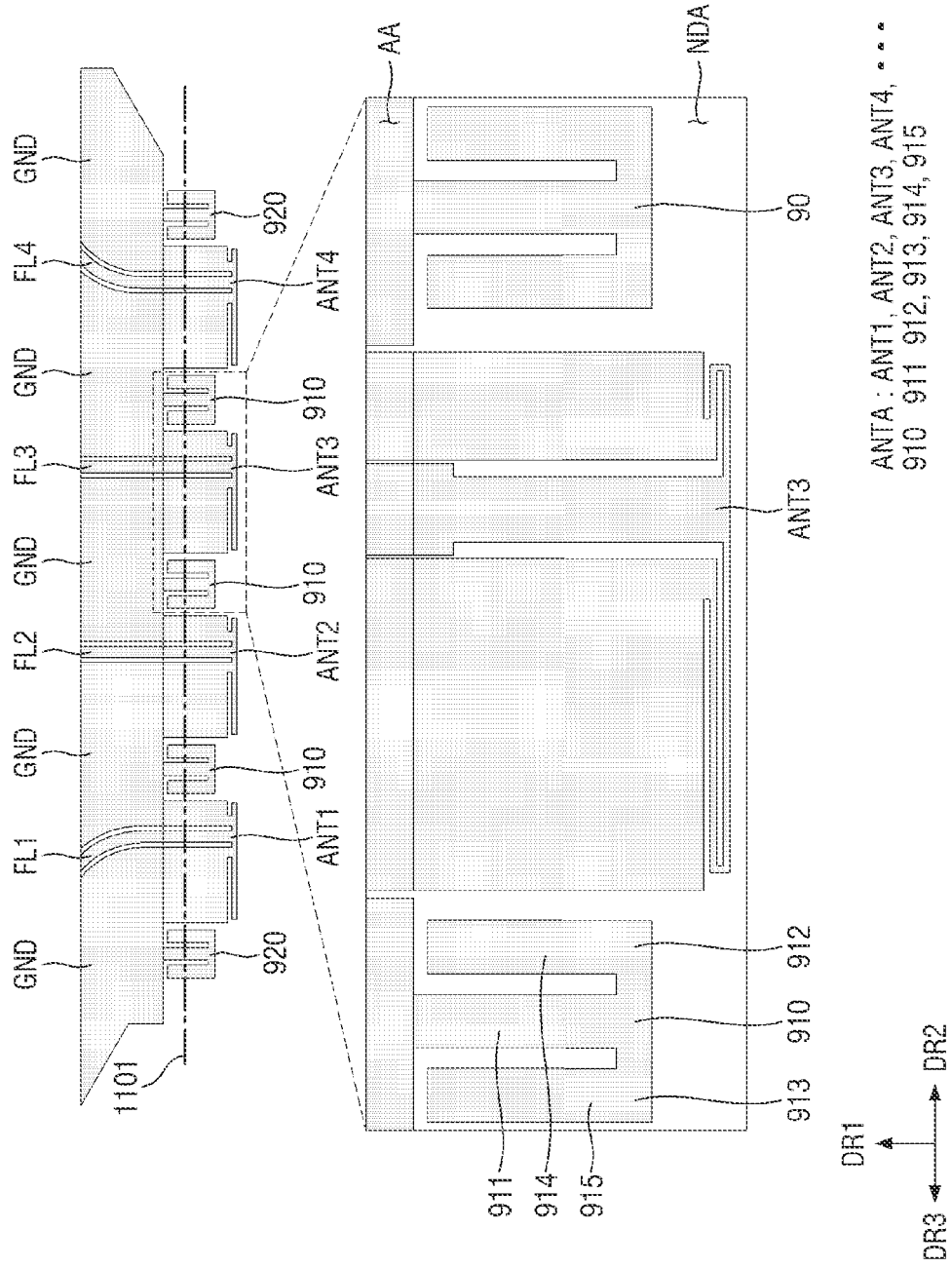
FIG. 11 is a plan view of an example of an antenna array according to an embodiment.

FIG. 11 is a plan view of the antenna array ANTA according to an embodiment.

Referring to FIG. 11, the display panel 300 according to an embodiment includes the antenna array ANTA disposed in the non-display area NDA. The antenna array ANTA is disposed in the non-display area NDA, and is disposed adjacent to the antenna area AA. The antenna array ANTA includes the plurality of antennas ANT connected to the feed lines FL and the ground lines GND disposed in the antenna area AA.

The array of the plurality of antennas ANT are the single-polarized array antennas ANT. For example, the plurality of antennas ANT may be disposed at equal or unequal intervals along the second direction DR2. FIG. 11 shows that one antenna array ANTA includes the first antenna ANT1, the second antenna ANT2, a third antenna ANT3, and a fourth antenna ANT4 that are sequentially disposed along the second direction DR2, but embodiments of the present disclosure are not necessarily limited thereto. For example, the antenna array ANTA may further include one or more antennas ANT sequentially disposed along the second direction DR2.

The shielding member 910, which includes the shielding electrodes 911, 912, 913, 914, and 915, are disposed between the plurality of antennas ANT. For example, the shielding member 910 is disposed between the first antenna ANT1 and the second antenna ANT2, and the corresponding shielding member 910 blocks surface waves that can be generated between the first antenna ANT1 and the second antenna ANT2. In addition, the shielding member 910 is disposed between the second antenna ANT2 and the third antenna ANT3, and the corresponding shielding member 910 blocks surface waves that can be generated between the second antenna ANT2 and the third antenna ANT3. Similarly, the shielding member 910 is disposed between the third antenna ANT3 and the fourth antenna ANT4, and the corresponding shielding member 910 blocks surface waves that can be generated between the third antenna ANT3 and the fourth antenna ANT4.

In addition, the shielding member 910 is disposed not only between the adjacent antennas ANT, but also on each of both sides of the antenna array ANTA. For example, an auxiliary shielding member 920 is disposed on each of both sides of the antenna array ANTA. The structure of the auxiliary shielding member 920 is substantially the same as the structure of the shielding member 910 disposed between the adjacent antennas ANT.

In accordance with an embodiment, the plurality of antennas ANT are independently driven. For example, the plurality of antennas ANT are respectively connected in one-to-one correspondence to the plurality of feed lines FL disposed in the antenna area AA. For example, the first antenna ANT1 is connected to the first feed line FL1 and the ground line GND. The second antenna ANT2 is connected to the second feed line FL2 and the ground line GND. The third antenna ANT3 is connected to the third feed line FL3 and the ground line GND. The fourth antenna ANT4 is connected to the fourth feed line FL4 and the ground line GND. The first to fourth antennas ANT1 to ANT4 have the same structure.

In accordance with an embodiment, the shielding member 910 (or the auxiliary shielding member 920) includes the shielding electrodes 911, 912, 913, 914, and 915 that block surface waves generated between the adjacent antennas ANT along the second direction DR2.

As shown in FIG. 11, the shielding electrodes 911, 912, 913, 914, and 915 form a fork shape as a whole. For example, the shielding member 910 includes the first shielding electrode 911 connected to the ground line GND and that extends in the first direction DR1, the second shielding electrode 912 that extends from the end of the first shielding electrode 911 in the second direction DR2, and the third shielding electrode 913 that extends from the end of the first shielding electrode 911 in a third direction DR3 opposite to the second direction DR2.

In accordance with an embodiment, the second shielding electrode 912 and the third shielding electrode 913 are symmetrically disposed with respect to the first shielding electrode 911. For example, the second shielding electrode 912 and the third shielding electrode 913 are aligned on an imaginary straight line 1101 that extends along the second direction DR2 or the third direction DR3, and have the same length. For example, the length of the second shielding electrode 912 along the second direction DR2 is substantially the same as the length of the third shielding electrode 913 along the second direction DR2.

In accordance with an embodiment, each shielding member 910 further includes the fourth shielding electrode 914 that extends from the end of the second shielding electrode 912 in the first direction DR1 along side of the first shielding electrode 911, and the fifth shielding electrode 915 that extends from the end of the third shielding electrode 913 in the first direction DR1 along side of the first shielding electrode 911. The length of the fourth shielding electrode 914 and the length of the fifth shielding electrode 915 are the same. For example, the length of the fourth shielding electrode 914 along the first direction DR1 and the length of the fifth shielding electrode 915 along the first direction DR1 are substantially the same. In accordance with an embodiment, the length of the fourth shielding electrode 914 or the fifth shielding electrode 915 is less than the length of the first shielding electrode 911.

In accordance with an embodiment, the lengths of the shielding electrodes 911, 912, 913, 914, and 915 that constitute the shielding member 910 are set in consideration of the driving frequency of each antenna ANT. For example, the total length of the shielding electrodes 911, 912, 913, 914, and 915, starting from the fourth shielding electrode 914 and continuing to the second shielding electrode 912, the third shielding electrode 913, and the fifth shielding electrode 915, is set to block surface waves generated by the adjacent antenna ANT when the corresponding antenna ANT operates in a transmission mode, such as a TX mode.

FIG. 11 illustrates that the shielding electrodes 911, 912, 913, 914, and 915 form a fork shape as a whole, but the shape of the shielding electrodes 911, 912, 913, 914, and 915 is not necessarily limited thereto. For example, as shown in FIG. 12, the shielding electrodes 911, 912, and 913 have a Latin alphabet capital letter "T" shape as a whole.

Figure 12:
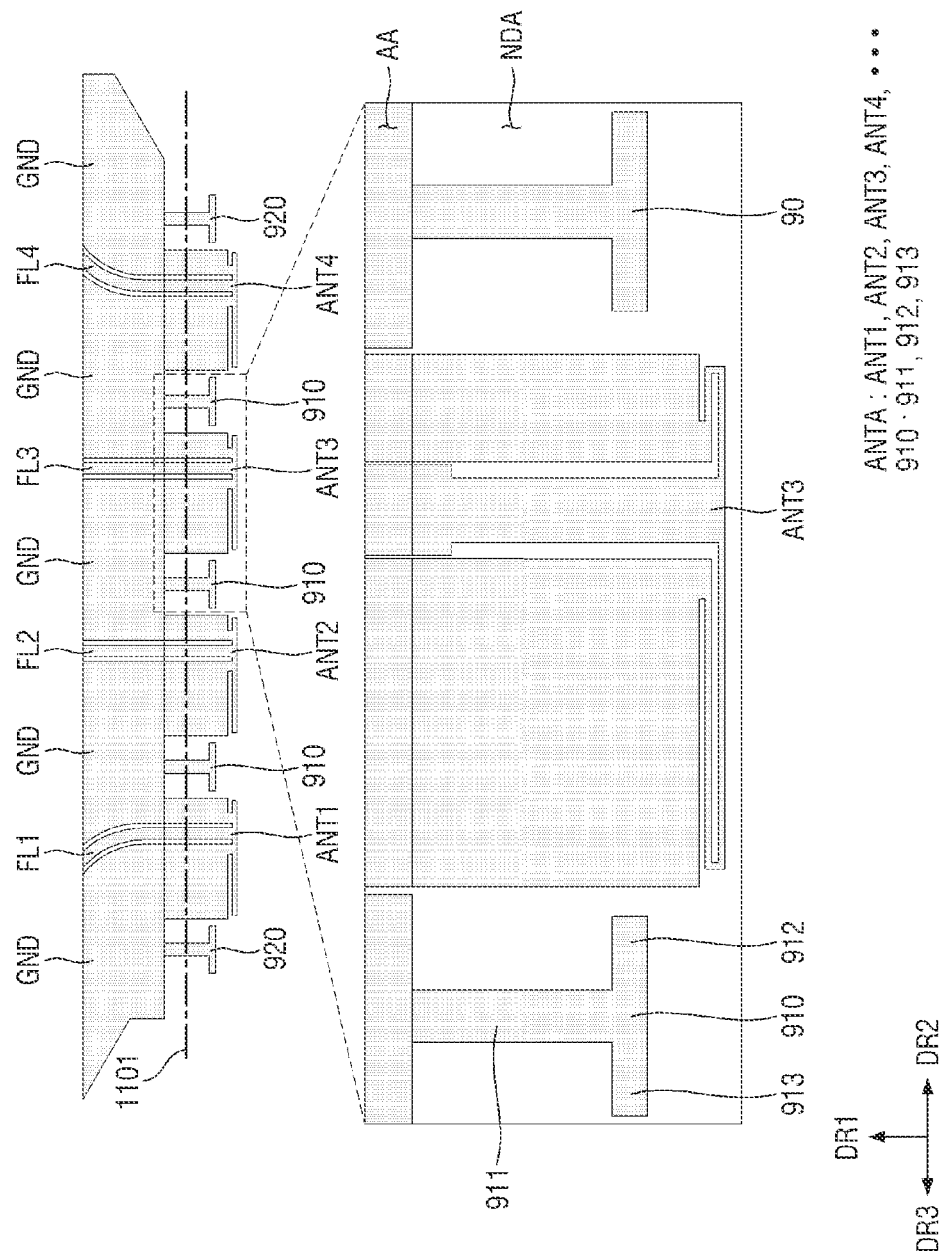
FIG. 12 is a plan view of a shielding electrode according to an embodiment

FIG. 12 is a plan view of another form of a shielding electrode according to an embodiment.

The embodiment of FIG. 12 differs from the embodiment of FIG. 11 in that the shielding electrode 911, 912, and 913 have a shape of a capital letter "T" of English alphabet as a whole. In FIG. 12, redundant description of parts already described in the embodiment of FIG. 11 will be omitted.

Referring to FIG. 12, the shielding electrodes 911, 912, and 913 form a Latin alphabet capital letter "T" shape as a whole. The shielding member 910 includes the first shielding electrode 911 connected to the ground line GND and that extends in the first direction DR1, the second shielding electrode 912 that extends from the end of the first shielding electrode 911 in the second direction DR2, and the third shielding electrode 913 that extends from the end of the first shielding electrode 911 in the third direction DR3 opposite to the second direction DR2.

In accordance with an embodiment, the second shielding electrode 912 and the third shielding electrode 913 are symmetrically disposed with respect to the first shielding electrode 911. For example, the second shielding electrode 912 and the third shielding electrode 913 are aligned on the imaginary straight line 1101 along the second direction DR2 or the third direction DR3, and have the same length. For example, the length of the second shielding electrode 912 along the second direction DR2 is substantially the same as the length of the third shielding electrode 913 along the second direction DR2.

Figure 13:
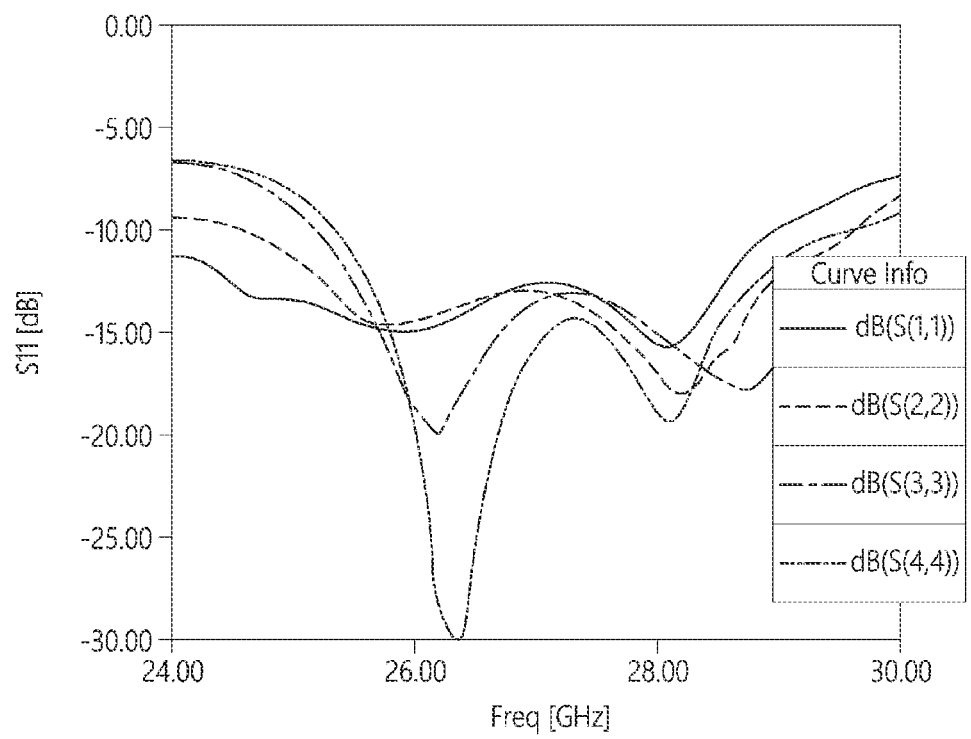
FIG. 13 illustrates a characteristic graph of an antenna according to an embodiment.
Figure 14:
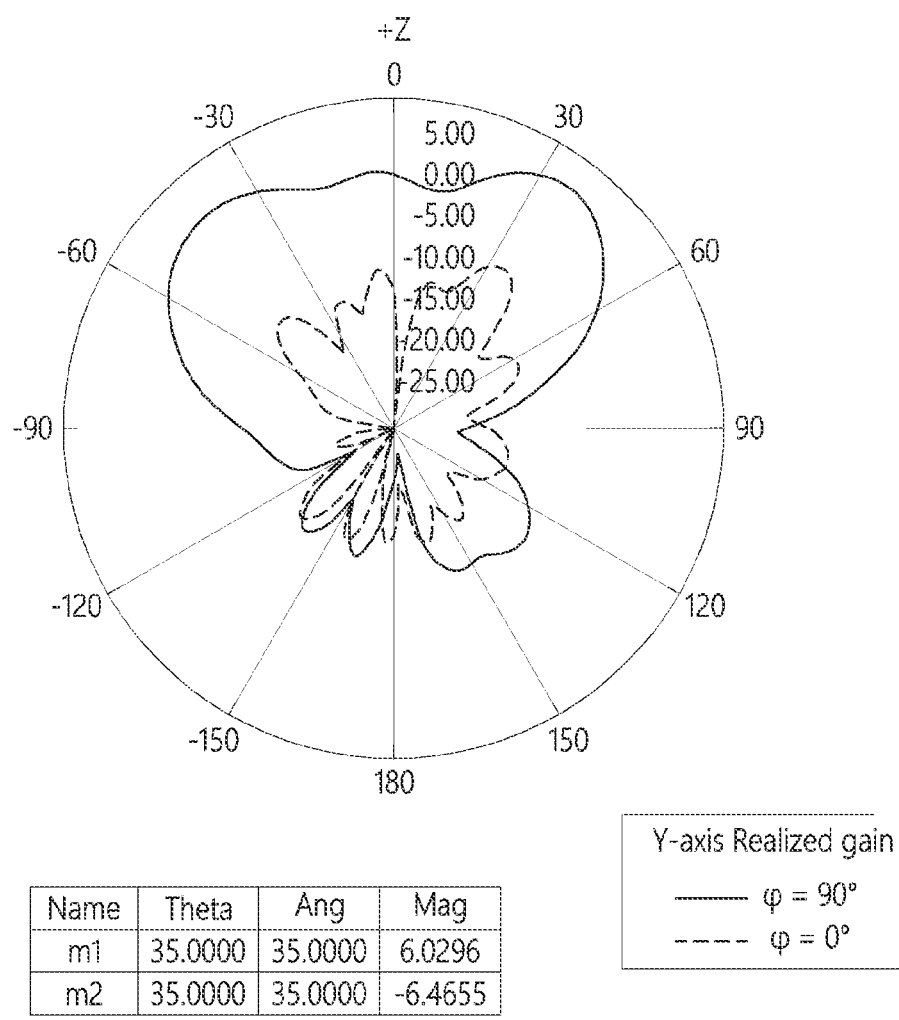
FIG. 14 illustrates a radiation pattern of an antenna according to an embodiment.

FIG. 13 illustrates a characteristic graph of the antenna ANT according to an embodiment. FIG. 14 illustrates a radiation pattern of the antenna ANT according to an embodiment.

Referring to FIGS. 13 and 14, the antenna ANT according to an embodiment, which is a Y-axis polarized antenna, has the following characteristics, but embodiments of the present disclosure are not necessarily limited thereto. For example, the antenna ANT according to an embodiment has a peak gain of up to 8.1 dBi at about 28.2 GHZ, and may have an operating frequency of about 3.8 GHz within a range of about 25.2 GHz to about 29 GHz. For the antenna array ANTA according to an embodiment, the distance between the adjacent antennas ANT is about 6 mm, and the design standard of the distance can change within about 5.35 mm to about 7 mm corresponding to the half wavelength of the frequency. The antenna ANT according to an embodiment has a cross polarization discrimination (XPD) of up to 12.5 dB in a direction perpendicular to the front surface of the display panel 300.

Figure 15:
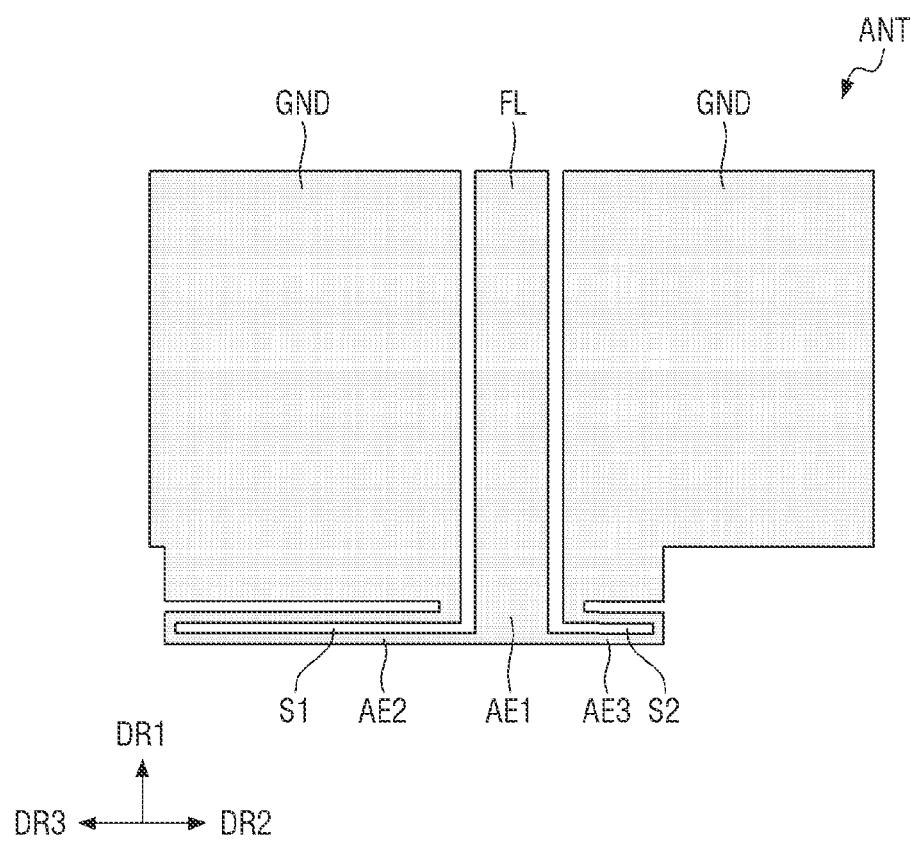
FIG. 15 illustrates an antenna according to an embodiment.

FIG. 15 illustrates the antenna ANT according to an embodiment.

Referring to FIG. 15, the antenna ANT according to an embodiment includes a first antenna electrode AE1 connected to the feed line FL, and a second antenna electrode AE2 and a third antenna electrode AE3 branched from the first antenna electrode AE1.

According to an embodiment, the first antenna electrode AE1 is disposed between the second antenna electrode AE2 and the third antenna electrode AE3. The second antenna electrode AE2 branches from one end of the first antenna electrode AE1 in one direction, such as the third direction DR3, and is connected to the ground line GND. The third antenna electrode AE3 branches from one end of the first antenna electrode AE1 in another direction, such as the second direction DR2, and is connected to the ground line GND.

According to an embodiment, the second antenna electrode AE2 and the third antenna electrode AE3 have an asymmetric shape with respect to the first antenna electrode AE1. For example, the length of the second antenna electrode AE2 in the third direction DR3 is greater than the length of the third antenna electrode AE3 in the second direction DR2. However, embodiments are not necessarily limited thereto, and in some embodiments, the length of the second antenna electrode AE2 in the third direction DR3 is less than the length of the third antenna electrode AE3 in the second direction DR2.

The second antenna electrode AE2 and the third antenna electrode AE3 respectively include the slot S1 and the slot S2 that extend in the second direction DR2 and the third direction DR3. The slot S1 of the second antenna electrode AE2 and the slot S2 of the third antenna electrode AE3 are asymmetrically formed with respect to the first antenna electrode AE1. For example, the length of the first slot S1 of the second antenna electrode AE2 is longer than the length of the second slot S2 of the third antenna electrode AE3.

In accordance with an embodiment, the slot S1 and the slot S2 respectively included in the second antenna electrode AE2 and the third antenna electrode AE3 have lengths that extend in the second direction DR2 (Y-axis direction), and the lengths and widths thereof can be variously changed in consideration of impedance matching.

Figure 16:
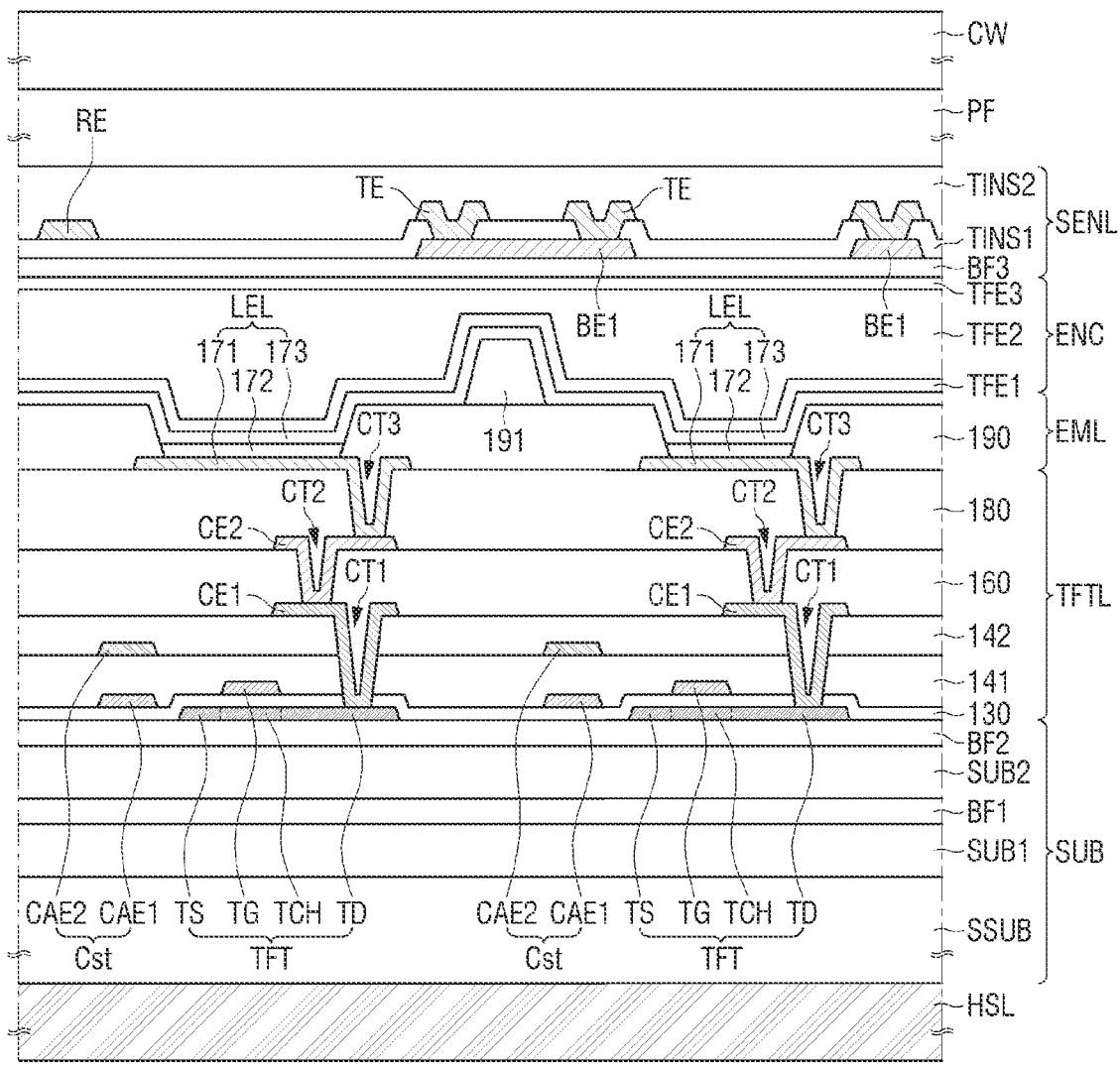
FIG. 16 is a cross-sectional view of a display area of a display panel according to an embodiment.

FIG. 16 is a cross-sectional view of a part of the display area of the display panel 300 according to an embodiment.

Referring to FIG. 16, in the display panel 300 according to an embodiment, the flexible substrate SUB is a base substrate.

The display layer DISL includes a thin film transistor layer TFTL and a light emitting element layer EML disposed on one surface of the substrate SUB, and the sensor electrode layer SENL, which includes sensor electrodes SE, is disposed on the encapsulation layer ENC. The polarizing film PF is disposed on the sensor electrode layer SENL, and the cover window CW is disposed on the polarizing film PF.

The substrate SUB includes a support substrate SSUB, a first substrate SUB1, a first buffer layer BF1, a second substrate SUB2, and a second buffer layer BF2 that are sequentially stacked. The first substrate SUB1 is disposed on the support substrate SSUB, the first buffer layer BF1 is disposed on the first substrate SUB1, the second substrate SUB2 is disposed on the first buffer layer BF1, and the second buffer layer BF2 is disposed on the second substrate SUB2.

The support substrate SSUB is a rigid substrate that supports the flexible first substrate SUB1 and the flexible second substrate SUB2. The support substrate SSUB is formed of glass or a plastic material such as polycarbonate (PC) or polyethylene terephthalate (PET).

The first substrate SUB1 and the second substrate SUB2 are formed of an organic material such as at least one of acryl resin, epoxy resin, phenolic resin, polyamide resin, or polyimide resin, etc. The first substrate SUB1 and the second substrate SUB2 may be formed of the same organic material or of different organic materials.

Each of the first buffer layer BF1 and the second buffer layer BF2 is formed of an inorganic material such as one of a silicon nitride layer, a silicon oxynitride layer, a silicon oxide layer, a titanium oxide layer, or an aluminum oxide layer. In another embodiment, each of the first buffer layer BF1 and the second buffer layer BF2 has a multilayer structure in which a plurality of layers, including one or more of a silicon nitride layer, a silicon oxynitride layer, a silicon oxide layer, a titanium oxide layer or an aluminum oxide layer, are alternately stacked. The first buffer layer BF1 and the second buffer layer BF2 may be formed of the same inorganic material or different inorganic materials.

An active layer that includes a channel region TCH, a source region TS, and a drain region TD of a thin film transistor TFT is disposed on the second buffer layer BF2. The active layer includes at least one of polycrystalline silicon, monocrystalline silicon, low-temperature polycrystalline silicon, amorphous silicon, or an oxide semiconductor material. When the active layer includes polycrystalline silicon or an oxide semiconductor material, the source region TS and the drain region TD of the active layer ACT are conductive regions doped with ions.

A gate insulating layer 130 is formed on the second buffer layer BF2 and the active layer ACT of the thin film transistor TFT. The gate insulating layer 130 is formed of an inorganic layer, such as one of a silicon nitride layer, a silicon oxynitride layer, a silicon oxide layer, a titanium oxide layer, or an aluminum oxide layer.

A gate electrode TG of the thin film transistor TFT and a first capacitor electrode CAE1 are disposed on the gate insulating layer 130. The gate electrode TG of the thin film transistor TFT overlaps the channel region TCH in the third direction DR3 (Z-axis direction). The gate electrode TG and the first capacitor electrode CAE1 may be formed of a single layer or of multiple layers that include any one of molybdenum (Mo), aluminum (Al), chromium (Cr), gold (Au), titanium (Ti), nickel (Ni), neodymium (Nd) or copper (Cu), or an alloy thereof.

A first interlayer insulating layer 141 is disposed on the gate insulating layer 130, the gate electrode TG and the first capacitor electrode CAE1. The first interlayer insulating layer 141 is formed of an inorganic layer, such as one of a silicon nitride layer, a silicon oxynitride layer, a silicon oxide layer, a titanium oxide layer, or an aluminum oxide layer. In other embodiments, the first interlayer insulating layer 141 includes a plurality of inorganic layers.

The second capacitor electrode CAE2 is disposed on the first interlayer insulating layer 141. The second capacitor electrode CAE2 overlaps the first capacitor electrode CAE1 in the third direction DR3 (Z-axis direction). Therefore, a capacitor Cst is formed by the first capacitor electrode CAE1, the second capacitor electrode CAE2 and an inorganic insulating dielectric layer disposed therebetween that serves as a dielectric layer. In an embodiment, the inorganic insulating dielectric layer is part of the first interlayer insulating layer 141. The second capacitor electrode CAE2 may be formed of a single layer or of multiple layers made of any one of molybdenum (Mo), aluminum (Al), chromium (Cr), gold (Au), titanium (Ti), nickel (Ni), neodymium (Nd) or copper (Cu), or an alloy thereof.

A second interlayer insulating layer 142 is disposed on the first interlayer insulating layer 141 and the second capacitor electrode CAE2. The second interlayer insulating layer 142 is formed of an inorganic layer, such as one of a silicon nitride layer, a silicon oxynitride layer, a silicon oxide layer, a titanium oxide layer, or an aluminum oxide layer. In another embodiment, the second interlayer insulating layer 142 includes a plurality of inorganic layers.

A first connection electrode CE1 is disposed on the second interlayer insulating layer 142. The first connection electrode CE1 is connected to the drain region TD through a first contact hole CT1 that penetrates the gate insulating layer 130, the first interlayer insulating layer 141, and the second interlayer insulating layer 142. The first connection electrode CE1 may be formed of a single layer or of multiple layers that include any one of molybdenum (Mo), aluminum (Al), chromium (Cr), gold (Au), titanium (Ti), nickel (Ni), neodymium (Nd) or copper (Cu), or an alloy thereof.

A first organic layer 160 is disposed on the second interlayer insulating layer 142 and the first connection electrode CE1 to flatten a stepped portion formed by the thin film transistors TFT. The first organic layer 160 is formed of an organic layer such as acryl resin, epoxy resin, phenolic resin, polyamide resin, or polyimide resin, etc.

A second connection electrode CE2 is disposed on the first organic layer 160. The second connection electrode CE2 is connected to the first connection electrode CE1 through a second contact hole CT2 that penetrates the first organic layer 160. The second connection electrode CE2 may be formed of a single layer or multiple layers that include any one of molybdenum (Mo), aluminum (Al), chromium (Cr), gold (Au), titanium (Ti), nickel (Ni), neodymium (Nd) or copper (Cu), or an alloy thereof.

A second organic layer 180 is disposed on the first organic layer 160 and the second connection electrode CE2. The second organic layer 180 is formed of an organic layer such as one of acryl resin, epoxy resin, phenolic resin, polyamide resin, or polyimide resin, etc.

The light emitting element layer EML is disposed on the thin film transistor layer TFTL. The light emitting element layer EML includes light emitting elements LEL and a bank 190.

Each of the light emitting elements LEL includes a pixel electrode 171, a light emitting layer 172, and a common electrode 173. Each of the emission areas is where the pixel electrode 171, the light emitting layer 172, and the common electrode 173 are sequentially stacked such that the holes from the pixel electrode 171 and the electrons from the common electrode 173 can combined with each other to emit light. For example, the pixel electrode 171 is an anode electrode, and the common electrode 173 is a cathode electrode.

The pixel electrode 171 is formed on the second organic layer 180. The pixel electrode 171 is connected to the second connection electrode CE2 through a third contact hole CT3 that penetrates the second organic layer 180.

In a top emission structure that emits light from the light emitting layer 172 toward the common electrode 173, the pixel electrode 171 may be formed of a single layer of one of molybdenum (Mo), titanium (Ti), copper (Cu), or aluminum (Al), or may have a stacked structure (Ti/Al/Ti) of aluminum and titanium, a stacked structure (ITO/Al/ITO) of aluminum and ITO, an APC alloy, or a stacked structure (ITO/APC/ITO) of an APC alloy and ITO to increase the reflectivity. The APC alloy is an alloy of silver (Ag), palladium (Pd) and copper (Cu).

The bank PDL defines the emission areas of the display pixels. For example, the bank 190 exposes a partial region of the pixel electrode 171 on the second organic layer 180. The bank 190 covers the edge of the pixel electrode 171. The bank 190 is disposed in a contact hole that penetrates the second organic layer 180. Therefore, the third contact hole CT3 that penetrates the second organic layer 180 is filled with the bank 190. The bank 190 is formed of an organic layer, such as at least one of an acryl resin, an epoxy resin, a phenolic resin, a polyamide resin, or a polyimide resin, etc.

A spacer 191 is disposed on the bank 190. The spacer 191 supports a mask during a process of manufacturing the light emitting layer 172. The spacer 191 is formed of an organic layer such as at least one of an acryl resin, an epoxy resin, a phenolic resin, a polyamide resin, or a polyimide resin, etc.

The light emitting layer 172 is formed on the pixel electrode 171. The light emitting layer 172 includes an organic material that emits light of a predetermined color. For example, the light emitting layer 172 includes a hole transporting layer, an organic material layer, and an electron transporting layer. The organic material layer includes a host and a dopant. The organic material layer includes a material that emits predetermined light, and includes a phosphorescent material or a fluorescent material.

For example, the organic material layer of the light emitting layer 172 of the first emission area that emits light of a first color is a phosphorescent material that includes a host material that includes carbazole biphenyl (CBP) or mCP (1,3-bis(carbazol-9-yl), and a dopant that includes at least one of PIQIr(acac)(bis(1-phenylisoquinoline)acetylacetonate iridium), PQIr(acac)(bis(1-phenylquinoline) acetylacetonate iridium), PQIr(tris(1-phenylquinoline)iridium)), or PtOEP (octaethylporphyrin platinum). In other embodiments, the organic material layer of the light emitting layer 172 of the first emission area is a fluorescent material that includes PBD:Eu(DBM)3(Phen) or Perylene, but embodiments of the present disclosure are not necessarily limited thereto.

The organic material layer of the light emitting layer 172 in a second emission area that emits light of a second color is a phosphorescent material that includes a host material that includes CBP or mCP, and a dopant material that includes Ir(ppy)3(fac tris(2-phenylpyridine)iridium. In other embodiments, the organic material layer of the light emitting layer 172 in the second emission area that emits light of the second color is a fluorescent material that includes tris(8-hydroxyquinolino)aluminum (Alq3), but embodiments of the present disclosure are not necessarily limited thereto.

The organic material layer of the light emitting layer 172 in the third emission area that emits light of a third color is a phosphorescent material that includes a host material that includes CBP or mCP, and a dopant material that includes (4,6-F2ppy)2Irpic or L2BD111, but embodiments of the present disclosure are not necessarily limited thereto.

The common electrode 173 is formed on the light emitting layer 172. The common electrode 173 covers the light emitting layer 172. The common electrode 173 is a common layer commonly formed in the emission areas. A capping layer may be formed on the common electrode 173.

In a top emission structure, the common electrode 173 is formed of a transparent conductive material (TCO) such as ITO or IZO that can transmit light, or a semi-transmissive conductive material such as magnesium (Mg), silver (Ag), or an alloy of magnesium (Mg) and silver (Ag). When the common electrode 173 is formed of a semi-transmissive conductive material, the light emission efficiency is increased due to a micro-cavity effect.

The encapsulation layer ENC is formed on the light emitting element layer EML. The encapsulation layer ENC includes at least one inorganic layer that prevents oxygen or moisture from permeating into the light emitting element layer EML. In addition, the encapsulation layer ENC includes at least one organic layer that protects the light emitting element layer EML from foreign substances such as dust. For example, the encapsulation layer ENC includes a first inorganic encapsulation layer TFE1, an organic encapsulation layer TFE2, and a second inorganic encapsulation layer TFE3.

The first inorganic encapsulation layer TFE1 is disposed on the common electrode 173, the organic encapsulation layer TFE2 is disposed on the first inorganic encapsulation layer TFE1, and the second inorganic encapsulation layer TFE3 is disposed on the organic encapsulation layer TFE2. The first inorganic encapsulation layer TFE1 and the second inorganic encapsulation layer TFE3 have a multilayer structure in which one or more inorganic layers of a silicon nitride layer, a silicon oxynitride layer, a silicon oxide layer, a titanium oxide layer or an aluminum oxide layer are alternately stacked. The organic encapsulation layer TFE2 includes an organic material, such as at least one of an acryl resin, an epoxy resin, a phenolic resin, a polyamide resin, or a polyimide resin, etc.

The sensor electrode layer SENL is disposed on the encapsulation layer ENC. The sensor electrode layer SENL includes a third buffer layer BF3, first connection portions BE1, a first sensor insulating layer TINS1, a second sensor insulating layer TINS2, and the sensor electrodes TE and RE.

The third buffer layer BF3 is disposed on the encapsulation layer ENC. The third buffer layer BF3 has insulating and optical functions. The third buffer layer BF3 includes at least one inorganic layer. For example, the third buffer layer BF3 has a multilayer structure in which one or more inorganic layers of a silicon nitride layer, a silicon oxynitride layer, a silicon oxide layer, a titanium oxide layer or an aluminum oxide layer are alternately stacked. The third buffer layer BF3 can be formed by one of a lamination process that uses a flexible material, a spin coating process that uses a solution-type material, a slit die coating process, or a deposition process. In an embodiment, the third buffer layer BF3 is omitted.

The first connection portions BE1 are disposed on the third buffer layer BF3. The first connection portions BE1 may be formed of a single layer that includes one of molybdenum (Mo), titanium (Ti), copper (Cu), or aluminum (Al), or may be formed of a stacked structure (Ti/Al/Ti) of aluminum and titanium, a stacked structure (ITO/Al/ITO) of aluminum and indium tin oxide (ITO), an Ag—Pd—Cu (APC) alloy, or a stacked structure (ITO/APC/ITO) of APC alloy and ITO.

The first sensor insulating layer TINS1 is disposed on the first connection portions BE1. The first sensor insulating layer TINS1 has insulating and optical functions. The first sensor insulating layer TINS1 is formed of an inorganic layer, such as one of a silicon nitride layer, a silicon oxynitride layer, a silicon oxide layer, a titanium oxide layer, or an aluminum oxide layer. The first sensor insulating layer TINS1 can be formed by one of a lamination process that uses a flexible material, a spin coating process that uses a solution-type material, a slit die coating process, or a deposition process.

The sensor electrodes include driving electrodes TE and sensing electrodes RE and are disposed on the first sensor insulating layer TNIS1. In addition, dummy patterns are disposed on the first sensor insulating layer TNIS1. The driving electrodes TE, the sensing electrodes RE, and the dummy patterns do not overlap the emission areas. The driving electrodes TE, the sensing electrodes RE, and the dummy patterns may be formed of a single layer that includes one of molybdenum (Mo), titanium (Ti), copper (Cu), or aluminum (Al), or may have a stacked structure (Ti/Al/Ti) of aluminum and titanium, a stacked structure (ITO/Al/ITO) of aluminum and indium tin oxide (ITO), an Ag—Pd—Cu (APC) alloy, or a stacked structure (ITO/APC/ITO) of APC alloy and ITO.

The second sensor insulating layer TINS2 is disposed on the first sensor insulating layer TINS1, the driving electrodes TE, the sensing electrodes RE, and the dummy patterns (not shown). The second sensor insulating layer TINS2 has an insulating function and an optical function. The second sensor insulating layer TINS2 includes at least one of an inorganic layer or an organic layer. The inorganic layer is one of a silicon nitride layer, a silicon oxynitride layer, a silicon oxide layer, a titanium oxide layer, or an aluminum oxide layer. The organic layer includes at least one of an acryl resin, an epoxy resin, a phenolic resin, a polyamide resin, or a polyimide resin. The second sensor insulating layer TINS2 can be formed by one of a lamination process that uses a flexible material, a spin coating process that uses a solution-type material, a slit die coating process, or a deposition process.

A heat dissipation layer HSL of the panel lower cover PB is disposed on the bottom surface of the support substrate SSUB of the substrate SUB. The heat dissipation layer HSL is formed of a metal thin film that contains, for example, at least one of copper, nickel, ferrite, or silver, which are thermally conductive materials that can shield electromagnetic waves.

Figure 17:
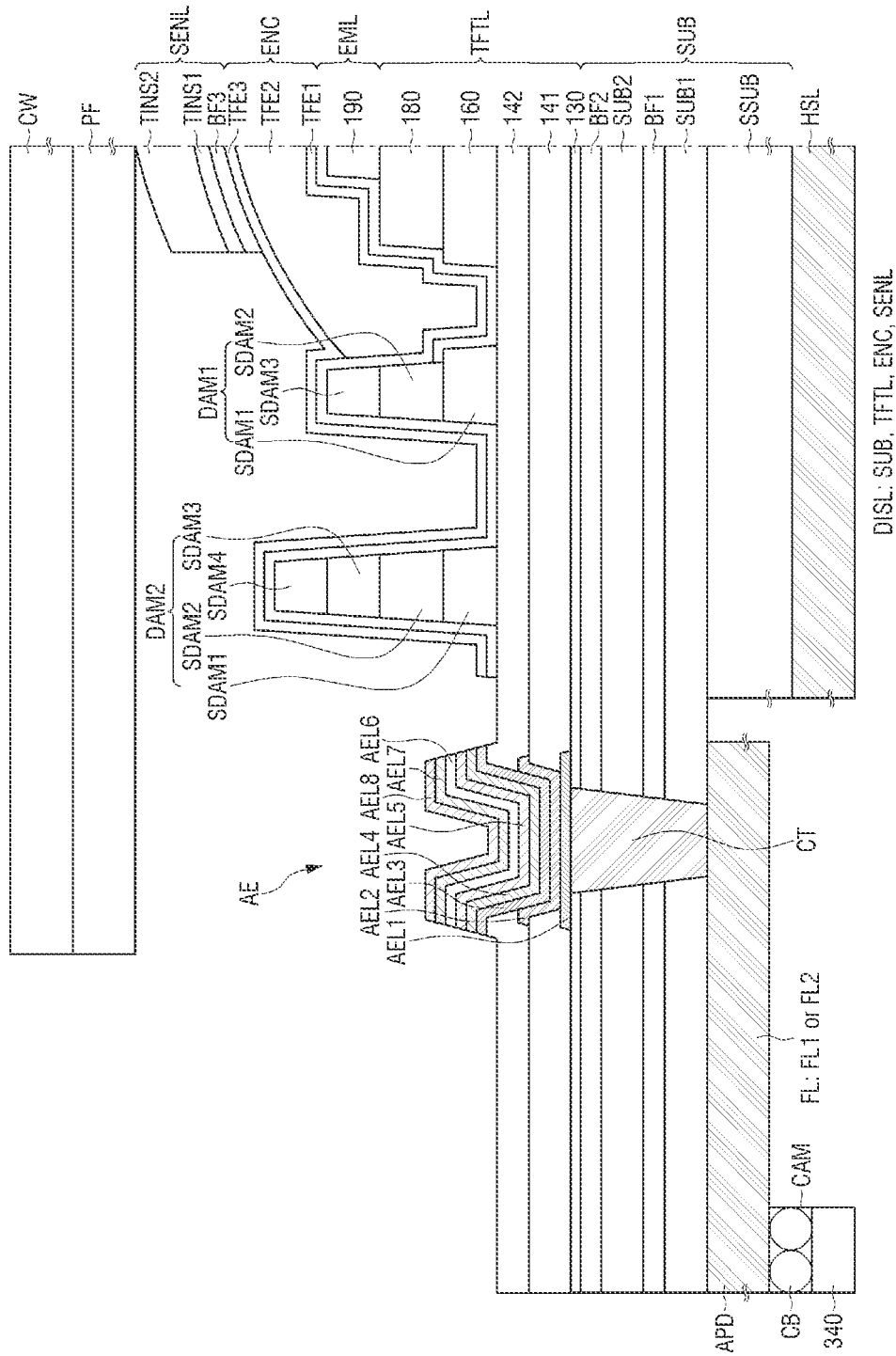
FIG. 17 is a cross-sectional view of a boundary between an antenna area and a non-display area adjacent thereto in a display device according to an embodiment.

FIG. 17 is a cross-sectional view of a boundary between the antenna area AA and the non-display area NDA adjacent thereto in the display device 10 according to an embodiment.

Referring to FIG. 17, in an embodiment, dams DAM1 and DAM2 that surround the display area DA are disposed in the non-display area NDA of the display panel 300. The dams include a first dam DAM1 and a second dam DAM2 disposed outward from the first dam DAM1, but embodiments of the present disclosure are not necessarily limited thereto. The first dam DAM1 and the second dam DAM2 are disposed on the second interlayer insulating layer 142.

The first dam DAM1 includes a first sub-dam SDAM1, a second sub-dam SDAM2, and a third sub-dam SDAM3 that are sequentially stacked. The first sub-dam SDAM1 is formed of the same material as the first organic layer 160, the second sub-dam SDAM2 is formed of the same material as the second organic layer 180, and the third sub-dam SDAM3 is formed of the same material as the bank 190.

The second dam DAM2 includes a first sub-dam SDAM1, a second sub-dam SDAM2, a third sub-dam SDAM3, and a fourth sub-dam SDAM4 that are sequentially stacked. The first sub-dam SDMA1 is formed of the same material as the first organic layer 160, and the second sub-dam SDAM2 is formed of the same material as the second organic layer 180. The third sub-dam SDAM3 is formed of the same material as the bank 190, and the fourth sub-dam SDAM4 is formed of the same material as the spacer 191 (see FIG. 16).

In FIG. 17, the antenna electrode AE refers to the antennas ANT of the antenna array ANTA described in conjunction with FIGS. 9 to 12. For example, the antenna electrode AE of FIG. 17 includes at least one of the first antenna electrode AE1, the second antenna electrode AE2, or the third antenna electrode AE3 of a specific antenna ANT in the antenna array ANTA.

In addition, the shielding electrodes 911, 912, 913, 914, and 915 of the shielding member 910 described in conjunction with FIGS. 9 to 12 are formed on the same layer as the antenna electrode AE shown in FIG. 17.

Referring to FIG. 17, in an embodiment, the antenna electrode AE includes first to eighth antenna electrode layers AEL1 to AEL8. However, embodiments of the present disclosure are not necessarily limited thereto, and in other embodiments, the antenna electrode AE includes only some of the antenna electrode layers AEL1 to AEL8.

The first antenna electrode layer AEL1 is made of the same material and formed by the same process as the gate electrode TG (see FIG. 16) of the thin film transistor TFT (see FIG. 16) and the first capacitor electrode CAE1 (see FIG. 16).

The second antenna electrode layer AEL2 is disposed on the first antenna electrode layer AEL1 that is exposed without being covered by the first interlayer insulating layer 141 (see FIG. 16). The second antenna electrode layer AEL2 is made of the same material and formed by the same process as the second capacitor electrode CAE2 (see FIG. 16).

The third antenna electrode layer AEL3 is disposed on the second antenna electrode layer AEL2 that is exposed without being covered by the second interlayer insulating layer 142 (see FIG. 16). The third antenna electrode layer AEL3 is made of the same material and formed by the same process as the first connection electrode CE1 (see FIG. 16).

The fourth antenna electrode layer AEL4 is disposed on the third antenna electrode layer AEL3. The fourth antenna electrode layer AEL4 is made of the same material and formed by the same process as the second connection electrode CE2 (see FIG. 16).

The fifth antenna electrode layer AEL5 is disposed on the fourth antenna electrode layer AEL4. The fifth antenna electrode layer AEL5 is made of the same material and formed by the same process as the pixel electrode 171 (see FIG. 16).

The sixth antenna electrode layer AEL6 is disposed on the fifth antenna electrode layer AEL5. The sixth antenna electrode layer AEL6 is made of the same material and formed by the same process as the common electrode 173 (see FIG. 16).

The seventh antenna electrode layer AEL7 is disposed on the sixth antenna electrode layer AEL6. The seventh antenna electrode layer AEL7 is made of the same material and formed by the same process as the first connection portion BE1 (see FIG. 16) of the sensor electrode layer SENL.

The eighth antenna electrode layer AEL8 is disposed on the seventh antenna electrode layer AEL7. The eighth antenna electrode layer AEL8 is made of the same material and formed by the same process as the driving electrode TE (see FIG. 16), the sensing electrode RE (see FIG. 16), and/or the dummy pattern of the sensor electrode layer SENL.

A through hole (or contact hole) CT penetrates through the first substrate SUB1, the first buffer layer BF1, the second substrate SUB2, and the second buffer layer BF2 of the substrate SUB. In addition, the through hole CT penetrates through the gate insulating layer 130.

The antenna electrode AE is in contact with the feed line FL through the through hole CT.

The antenna pad APD is electrically connected to the feed line FL and is disposed at the end of the feed line FL. The feed line FL and the antenna pad APD are disposed on the bottom surface of the first substrate SUB1 of the substrate SUB. Since the antenna area AA is bent and disposed under the main area MA, the support substrate SSUB of the substrate SUB is removed from the antenna area AA where the feed line FL is disposed.

The antenna pad APD is connected to the antenna circuit board 340 by an anisotropic conductive film that includes a conductive ball CB and a conductive adhesive member CAM such as an anisotropic conductive adhesive.

Figure 18:
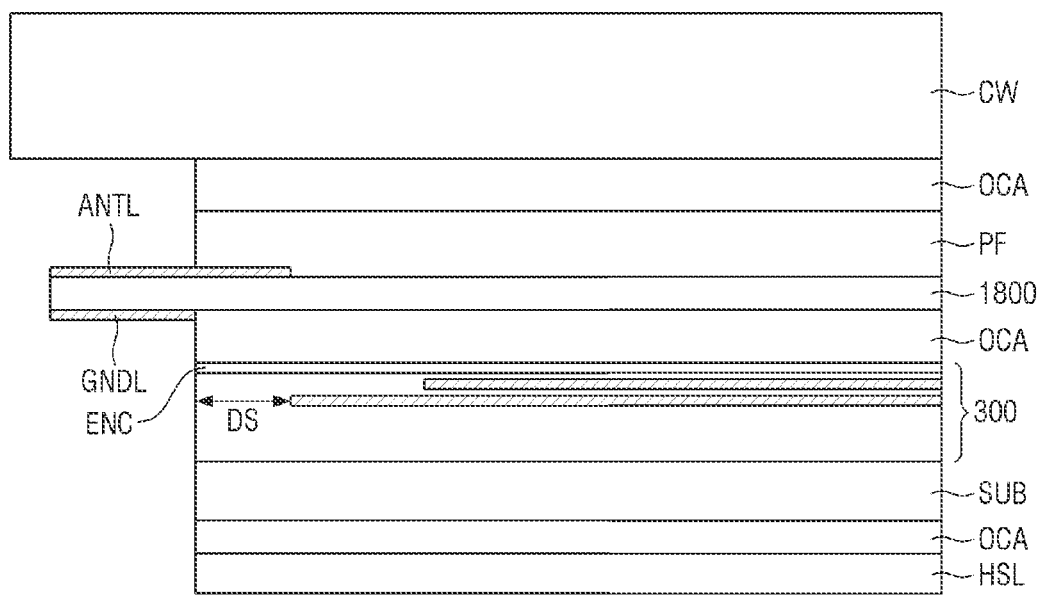
FIG. 18 is a cross-sectional view of a display device in which a transparent dielectric substrate that includes an antenna is attached to a display panel according to an embodiment.

FIG. 18 is a cross-sectional view of an example of the display device 10 in which a transparent dielectric substrate 1800, such as a transparent dielectric layer, that includes the antenna ANT is attached on the display panel 300.

Referring to FIG. 18, in an embodiment, the transparent dielectric substrate 1800 that includes the antenna array ANTA is attached to the encapsulation layer ENC of the display panel 300.

In accordance with an embodiment, the transparent dielectric substrate 1800 includes a stacked structure formed by a FPCB manufacturing process. For example, the antennas ANT of the antenna array ANTA, the shielding member 910, and the feed line FL that are described with reference to FIGS. 9 to 12 are disposed on the top surface of the transparent dielectric substrate 1800. A ground layer GNDL that includes the ground line GND is disposed on the bottom surface of the transparent dielectric substrate 1800.

The end of the transparent dielectric substrate 1800 extends outside the display panel 300. For example, the transparent dielectric substrate 1800 includes a first portion that overlaps the display panel 300, and a second portion that extends from the end of the first portion out (e.g., leftward in the illustrated example) from the display panel 300 and does not overlap the display panel 300. The antennas ANT of the antenna array ANTA and the shielding member 910 are disposed at the first portion of the transparent dielectric substrate 1800 and correspond to the dead space area DS of the display panel 300. The feed line FL electrically connected to the antenna electrode, and the ground layer GNDL that overlaps the feed line FL are disposed on the second portion of the transparent dielectric substrate 1800.

The second portion of the transparent dielectric substrate 1800, i.e., a part of the transparent dielectric substrate 1800 on which the feed line FL of an antenna layer ANTL and the ground layer GNDL are formed, can be bent, and the bent second portion of the transparent dielectric substrate 1800 may be disposed under the display panel 300.

In concluding the detailed description, those skilled in the art will appreciate that many variations and modifications can be made to the disclosed embodiments without substantially departing from the principles of the present disclosure. Therefore, the disclosed embodiments are used in a generic and descriptive sense only and not for purposes of limitation.

What is claimed is:

1. A display device, comprising:
  a display panel that includes a display area that displays an image, a non-display area disposed at an edge of the display area, and an antenna area protruding in a first direction from a part of the non-display area; and
  an antenna driving substrate electrically connected to an antenna array through an antenna pad disposed adjacent to an end of the antenna area,
  wherein the antenna array is disposed at a boundary between the antenna area and a portion of the non-display area adjacent to the antenna area;
  wherein the antenna array comprises:
    a plurality of antennas that generate polarized waves in a second direction perpendicular to the first direction and that are disposed at intervals along the second direction; and
    a shielding member disposed between adjacent antennas and connected to a ground line.

2. The display device of claim 1, wherein the shielding member comprises a shielding electrode between adjacent antennas that blocks surface waves formed along the second direction.

3. The display device of claim 2, wherein the shielding member comprises:
  a first shielding electrode connected to the ground line and that extends in the first direction;

a second shielding electrode that extends in the second direction from an end of the first shielding electrode; and a third shielding electrode that extends from the end of the first shielding electrode in a third direction opposite to the second direction.

4. The display device of claim 3, wherein the second shielding electrode and the third shielding electrode are symmetrically disposed with respect to the first shielding electrode.

5. The display device of claim 3, wherein the second shielding electrode and the third shielding electrode are aligned on an imaginary straight line along the second direction or the third direction.

6. The display device of claim 3, wherein the shielding member further comprises:
   a fourth shielding electrode that extends in the first direction from an end of the second shielding electrode and parallel to the first shielding electrode; and
   a fifth shielding electrode that extends in the first direction from an end of the third shielding electrode and parallel to the first shielding electrode.

7. The display device of claim 6, wherein a length of the fourth shielding electrode and a length of the fifth shielding electrode are equal to each other.

8. The display device of claim 7, wherein a length of the fourth shielding electrode or the fifth shielding electrode is less than a length of the first shielding electrode.

9. The display device of claim 6, wherein the antenna array is disposed on the same layer as at least one of electrodes of a thin film transistor disposed in the display area.

10. The display device of claim 6,
    wherein the antenna array is included in a transparent dielectric substrate disposed on an encapsulation layer of the display panel,
    wherein the transparent dielectric substrate comprises:
      a flexible transparent dielectric layer;
      an antenna layer disposed on a top surface of the transparent dielectric layer and that includes the antenna array; and
      a ground layer disposed on a rear surface of the transparent dielectric layer and that includes the ground line.

11. The display device of claim 1, wherein each of the plurality of antennas comprises:
    a first antenna electrode connected to a feed line and that extends in a first direction;
    a second antenna electrode branched from an end of the first antenna electrode in the second direction and connected to the ground line; and
    a third antenna electrode branched from the end of the first antenna electrode in a third direction opposite to the second direction and connected to the ground line.

12. The display device of claim 11, wherein a length of the second antenna electrode in the second direction is greater than a length of the third antenna electrode in the third direction.

13. The display device of claim 11, wherein each of the plurality of antennas comprises at least one slot.

14. The display device of claim 1, further comprising
    an auxiliary shielding member disposed on each of both sides of the antenna array, wherein
    a structure of the auxiliary shielding member is the same as that of the shielding member.

15. The display device of claim 1, wherein at least a part of the antenna area is bent and parallel to the antenna array under the display panel.

16. A mobile electronic device, comprising:
    a display panel that includes a display area that displays an image, a non-display area disposed at an edge of the display area, and an antenna area that protrudes in a first direction from a part of the non-display area; and
    an antenna driving substrate electrically connected to an antenna array through an antenna pad disposed adjacent to an end of the antenna area,
    wherein the antenna array comprises:
      a plurality of antennas that generate polarized waves in a second direction perpendicular to the first direction and that are disposed at intervals along the second direction; and
      a shielding member disposed between adjacent antennas and connected to a ground line,
      wherein the shielding member comprises a shielding electrode that blocks surface waves formed along the second direction between the adjacent antennas.

17. The mobile electronic device of claim 16, wherein the antenna array is disposed at a boundary between the antenna area and a portion of the non-display area adjacent to the antenna area.

18. The mobile electronic device of claim 16, wherein the shielding member comprises:
    a first shielding electrode connected to the ground line and that extends in the first direction;
    a second shielding electrode that extends in the second direction from an end of the first shielding electrode; and
    a third shielding electrode that extends from the end of the first shielding electrode in a third direction opposite to the second direction.

19. The mobile electronic device of claim 18, wherein the second shielding electrode and the third shielding electrode are symmetrically disposed with respect to the first shielding electrode.

20. The mobile electronic device of claim 18, wherein the second shielding electrode and the third shielding electrode are aligned on an imaginary straight line along the second direction or the third direction.

* * * * *